US012572050B2

(12) United States Patent
Jung et al.

(10) Patent No.: US 12,572,050 B2
(45) Date of Patent: Mar. 10, 2026

(54) SEMICONDUCTOR DEVICE INCLUDING OPTICAL RING WAVEGUIDE

(71) Applicant: Taiwan Semiconductor Manufacturing Company, Ltd., Hsinchu (TW)

(72) Inventors: Ming Yang Jung, Kaohsiung City (TW); Chewn-Pu Jou, Hsinchu (TW); Stefan Rusu, Sunnyvale, CA (US); Lan-Chou Cho, Hsinchu City (TW); Tai-Chun Huang, Hsin-Chu City (TW); You-Cheng Lu, Tainan City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 267 days.

(21) Appl. No.: 18/349,968

(22) Filed: Jul. 11, 2023

(65) Prior Publication Data

US 2025/0020967 A1     Jan. 16, 2025

(51) Int. Cl.
G02F 1/225 (2006.01)
G02F 1/01 (2006.01)

(52) U.S. Cl.
CPC .......... G02F 1/2257 (2013.01); G02F 1/0147 (2013.01); *G02F 2201/063* (2013.01); *G02F 2203/15* (2013.01)

(58) Field of Classification Search
CPC ............ G02B 6/12002; G02B 6/29338; G02F 1/3135; G02F 2203/15
USPC ............................................. 385/1–3, 14, 32
See application file for complete search history.

(56) References Cited

U.S. PATENT DOCUMENTS

| | | | | |
|---|---|---|---|---|
| 4,483,583 A | * | 11/1984 | Unger ................. | G02B 6/2821 385/28 |
| 5,878,070 A | * | 3/1999 | Ho ........................ | H01S 5/1075 385/32 |
| 6,411,752 B1 | * | 6/2002 | Little ..................... | G02B 6/126 385/24 |
| 6,907,152 B2 | * | 6/2005 | Takahashi .......... | G02B 6/12007 372/92 |
| 7,215,848 B2 | * | 5/2007 | Tan ....................... | G02F 1/0955 385/32 |
| 7,840,099 B2 | * | 11/2010 | Pan ....................... | G02F 1/3136 385/9 |
| 7,929,817 B2 | * | 4/2011 | Uemura ............. | G02B 6/12007 385/24 |
| 8,993,380 B2 | | 3/2015 | Hou et al. | |

(Continued)

FOREIGN PATENT DOCUMENTS

| | | |
|---|---|---|
| CN | 109541745 | 3/2019 |
| TW | 202004240 | 1/2020 |

OTHER PUBLICATIONS

"Office Action of Taiwan Counterpart Application", issued on Jul. 11, 2024, p. 1-p. 6.

*Primary Examiner* — Robert Tavlykaev
(74) *Attorney, Agent, or Firm* — JCIPRNET

(57) ABSTRACT

A semiconductor device and a manufacturing method thereof are provided. The device includes a dielectric layer, a ring waveguide embedded in the dielectric layer, and an input/output (I/O) waveguide embedded in the dielectric layer and optically coupled to the ring waveguide in a vertical manner. Materials of the dielectric layer, the ring waveguide, and the I/O waveguide are different.

20 Claims, 21 Drawing Sheets

(56)　　　　　　References Cited

U.S. PATENT DOCUMENTS

| | | | |
|---|---|---|---|
| 9,281,254 | B2 | 3/2016 | Yu et al. |
| 9,299,649 | B2 | 3/2016 | Chiu et al. |
| 9,372,206 | B2 | 6/2016 | Wu et al. |
| 9,425,126 | B2 | 8/2016 | Kuo et al. |
| 9,443,783 | B2 | 9/2016 | Lin et al. |
| 9,461,018 | B1 | 10/2016 | Tsai et al. |
| 9,496,189 | B2 | 11/2016 | Yu et al. |
| 9,666,502 | B2 | 5/2017 | Chen et al. |
| 9,735,131 | B2 | 8/2017 | Su et al. |
| 2004/0126072 | A1* | 7/2004 | Hoon Lee .............. G02B 6/122 |
| | | | 385/27 |
| 2009/0226129 | A1* | 9/2009 | Kuipers ................ G02F 1/3132 |
| | | | 385/14 |
| 2013/0156369 | A1 | 6/2013 | Park et al. |
| 2018/0307118 | A1* | 10/2018 | Sciancalepore ....... G02F 1/3536 |
| 2020/0200974 | A1* | 6/2020 | Le Maitre ............... G02F 1/225 |
| 2022/0229346 | A1* | 7/2022 | Blanco-Redondo ......................... |
| | | | G02B 6/12007 |
| 2024/0241314 | A1* | 7/2024 | Bian .................... G02B 6/2821 |

\* cited by examiner $16 \begin{cases} 16D \\ 16M \end{cases}$ $16 \begin{cases} 16D \\ 16M \end{cases}$ $233\text{-}3 \begin{cases} 2331 \\ 2332 \end{cases}$ $131A \begin{cases} 1311 \\ 1312 \end{cases}$ $160 \begin{cases} 161 \\ 162 \end{cases}$

231W 161          162

15/16D

231

S1

233P          233-1D          233N
                (233-2D)

233TW

FIG. 6B $160 \begin{cases} 161 \\ 162 \end{cases}$        $233\text{-}4 \begin{cases} 233P' \\ 233N' \\ 233R \end{cases}$ $131D \begin{cases} 1311 \\ 1312 \\ 1311' \begin{cases} 1311P \\ 1312N \end{cases} \end{cases}$ $160 \begin{cases} 161 \\ 162 \end{cases}$

SEMICONDUCTOR DEVICE INCLUDING OPTICAL RING WAVEGUIDE

BACKGROUND

Silicon photonics using use silicon waveguides as interconnects to carry optical signals is compatible with the fabrication of integrated circuits (ICs). As compared to data transmission by conductive wires, silicon photonics may offer reduced power consumption, higher efficiency, lower latency, and higher bandwidth. Although existing silicon photonics are generally adequate for their intended purposes, they are not satisfactory in all aspects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6B illustrates a schematic cross-sectional view of the optical device taken along the line 6B-6B in FIG. 6A, in accordance with some embodiments.

DETAILED DESCRIPTION

Figure 1A:
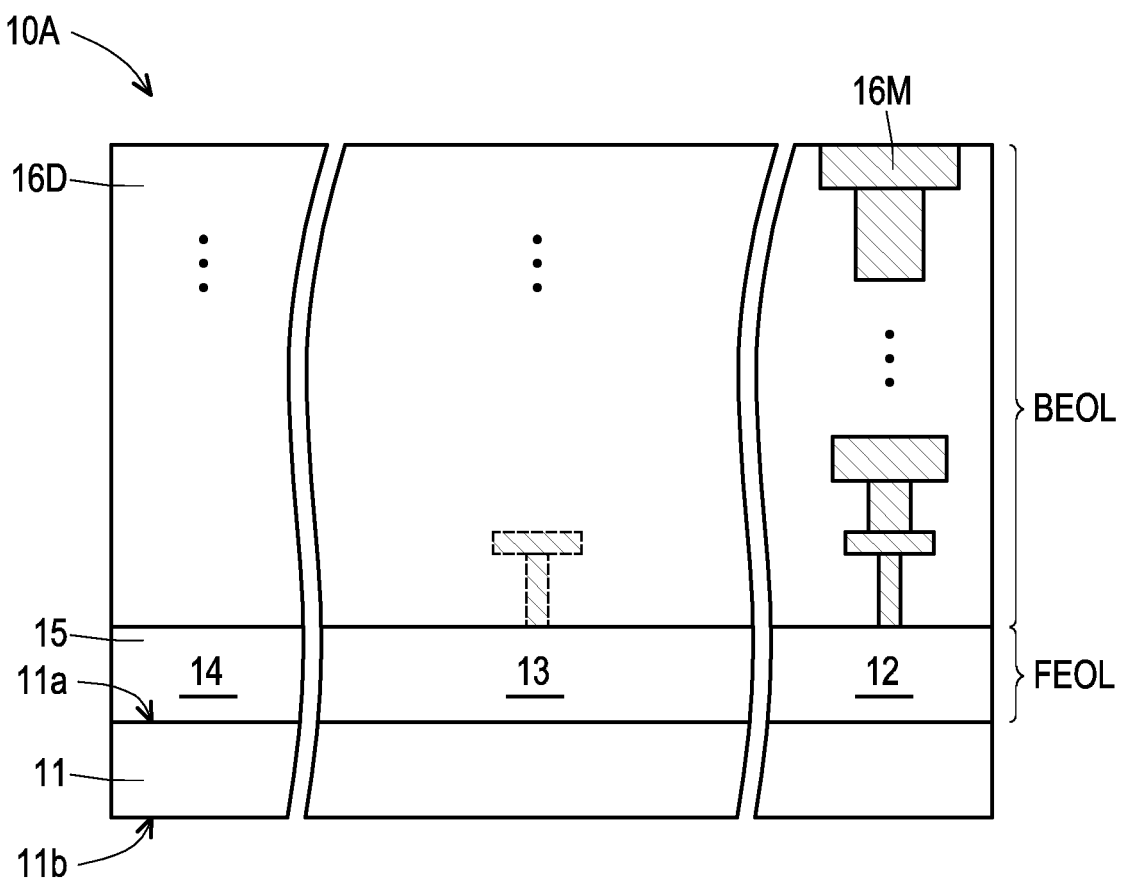
FIGS. 1A and 1B illustrate schematic cross-sectional views of variations of a semiconductor structure including an optical device, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A ring waveguide may be included in a semiconductor device used for optical communication systems and may be realized in an optical device with input/output (I/O) waveguides. For example, the ring waveguide includes a closed-loop waveguide serving as a resonator, and I/O waveguide(s) optically and horizontally coupled to the resonator in the coupling region for inputting signal light into the resonator and outputting signal light therefrom. When the light couples from the input waveguide into the resonator, the light intensity gradually increases due to constructive interference in the closed loop resonator, and outputs from the resonator to the output waveguide. The input waveguide and the output waveguide may be a single waveguide at two opposing ends or may be two discrete waveguides disposed at two opposing sides of the resonator. The optical resonator may be operable as an optical filter, since only selected wavelengths will be at resonance within the closed loop. In some examples, the ring waveguide may form a micro-ring modulator for modulating a phase of optical signals traveling within the waveguide. In some examples, the ring waveguide may form a wavelength division multiplexing which multiplexes optical signals onto an optical fiber by using different wavelengths of light. It has been observed that a silicon-on-insulator (SOI) photonic device having a silicon ring waveguide and a silicon I/O waveguide that are formed in the same layer is sensitive to silicon patterning process because the coupling efficiency is impacted by non-uniform gap spacing between the ring waveguide and the I/O waveguide due to patterning process variations.

The embodiments of the present disclosure provide a semiconductor structure including an optical device, where the optical device includes a ring waveguide and one or more input/output (I/O) waveguides that are optically coupled to the ring waveguide in a vertical manner. For example, the ring waveguide and the I/O waveguides are made of different materials and located in different layers. By configuring different materials of the ring waveguide and the I/O waveguide(s) and disposing the ring waveguide and the I/O waveguide(s) at different layers, a vertical gap distance between the ring waveguide and the I/O waveguide may be well-controlled, thereby improving the coupling efficiency of the optical device. The gap spacing between the ring waveguide and the I/O waveguide is determined by the thickness of the dielectric material interposed therebetween. Such vertical coupling scheme may provide flexibility in the design of the ring waveguide and the I/O waveguide to form an optical communication system. In addition, the vertical coupling mechanism may have better coupling and loss characteristics as compared to the horizontal coupling mechanism.

Figure 1B:
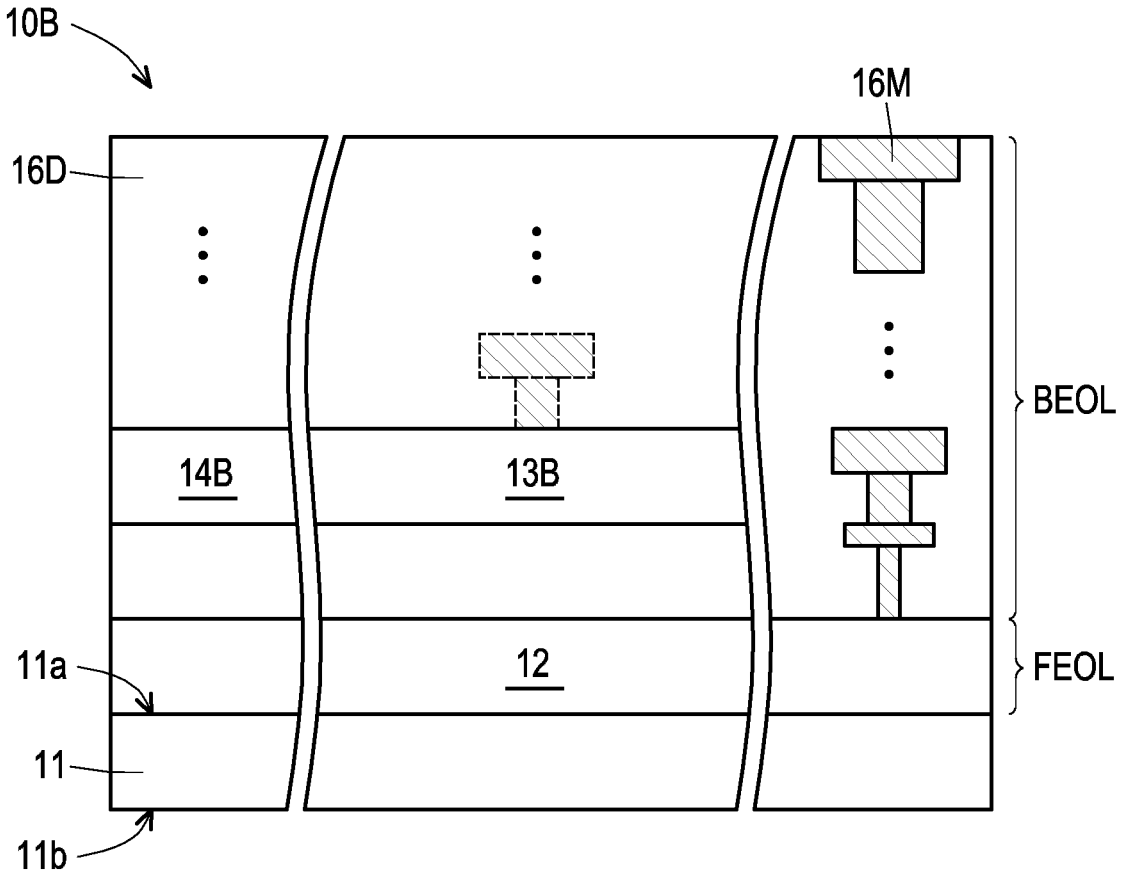

FIGS. 1A and 1B illustrate schematic cross-sectional views of variations of a semiconductor structure including an optical device, in accordance with some embodiments. Throughout the various views and illustrative embodiments, like reference numbers are used to designate like elements. Referring to FIG. 1A, a semiconductor device 10A includes a semiconductor substrate 11, such as silicon, doped or undoped, or an active layer of a semiconductor-on-insulator (SOI) substrate. The semiconductor substrate 11 may include other semiconductor materials, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other substrates, such as multi-layered or gradient substrates, may also be used. The semiconductor substrate 11 may include an active surface 11a (also called a front side) and a rear surface 11b (also called a back side).

In some embodiments, various devices are formed at/over the active surface 11a of the semiconductor substrate 11. An inter-layer dielectric (ILD) layer 15 may be disposed over the active surface 11a of the semiconductor substrate 11, where the ILD layer 15 surrounds and covers the devices. The ILD layer 15 may include one or more dielectric sublayers formed of materials such as Phospho-Silicate Glass (PSG), Boro-Silicate Glass (BSG), Boron-Doped Phospho-Silicate Glass (BPSG), undoped Silicate Glass (USG), the like, or combinations thereof. The devices may include active devices 12 (e.g., transistors, diodes, etc.) and at least one optical device 13. The active devices 12 and the optical device 13 may be formed at a same level in the ILD layer 15 through a front-end-of-line (FEOL) process. In some embodiments, devices further include passive devices (e.g., capacitors, resistors, etc.; not shown) or the like. In some embodiments, an optical input/output (I/O) portion 14 is disposed over the active surface 11a of the semiconductor substrate 11 and optically coupled to the optical device 13. For example, the optical I/O portion 14 laterally adjoining the optical device 13 is formed through the FEOL process. The optical I/O portion 14 may be or include grating couplers, edge couplers, or couplers for inputting signal light into the optical device 13 and outputting signal light therefrom.

In some embodiments, an interconnect structure 16 is formed over the semiconductor substrate 11 and interconnects one or more devices to form functional circuits. For example, the functional circuits include logic circuits, memory circuits, sense amplifiers, controllers, input/output circuits, image sensor circuits, the like, or combinations thereof. The interconnect structure 16 may include interconnect dielectric layers 16D and interconnect wirings 16M embedded in the interconnect dielectric layers 16D and may be formed through a back-end-of-line (BEOL) process. The interconnect dielectric layers 16D may include low-k dielectric materials; a polymeric material such as polybenzoxazole (PBO), polyimide, benzocyclobutene (BCB), or the like; a nitride; an oxide such as silicon oxide, PSG, BSG, BPSG, or a combination thereof. The interconnect wirings 16M may include a conductive material such as solder, copper, aluminum, gold, nickel, silver, palladium, tin, the like, or a combination thereof. The interconnect wirings 16M include conductive lines, conductive vias, and conductive pads, and other conductive features that are electrically coupled to one or more devices (e.g., the active devices 12).

In some embodiments, the bottommost via of the interconnect wirings 16M is in electrical and physical contact with the active devices 12. In some embodiments, the dimension of the interconnect wirings 16M increases from bottom to top. The interconnect wirings 16M may be coupled to the optical device 13 as the conductive features 160 shown in the embodiments of FIGS. 6A-10B. Alternatively, the interconnect wirings 16M do not coupled to the optical device 13; therefore, a portion of the interconnect wirings landing on the optical device 13 is illustrated in the dashed lines to indicate it may or may not exist. It is noted that the elements in FIG. 1A are provided for illustrative purposes only, and other embodiments may utilize fewer or additional elements. In some embodiments, the semiconductor device 10A, in whole or in part, acts as an I/O interface between optical signals and electrical signals in a photonic system. The semiconductor device 10A described herein may be considered as a system-on-chip (SoC) device or a system-on-integrated-circuit (SoIC) device.

Referring to FIG. 1B and with reference to FIG. 1A, a semiconductor device 10B is similar to the semiconductor device 10A, except that the optical device 13B and the optical I/O portion 14B optically coupled to the optical device 13B are disposed over the active devices 12. The optical device 13B and the optical I/O portion 14B may be embedded in the interconnect dielectric layer 16D and may be formed through the BEOL process. The interconnect wirings 16M may be coupled to the optical device 13B as the conductive features 160 shown in the embodiments of FIGS. 6A-10B. Alternatively, the interconnect wirings 16M do not coupled to the optical device 13B; therefore, a portion of the interconnect wirings landing on the optical device 13B is illustrated in the dashed lines to indicate it may or may not exist. The optical device 13/13B may be formed from a semiconductor material and a dielectric material using integrated circuit (IC) processes. This allows one or more of the optical device 13/13B to be co-located on the semiconductor substrate 11 together with integrated circuitry to provide a capability for optical phase shifting, signal routing, switching, filtering, detection, and/or the like. The optical devices 13/13B may be described in greater detail below with reference to the accompanying FIGS. 2A-10B.

Figure 2A:
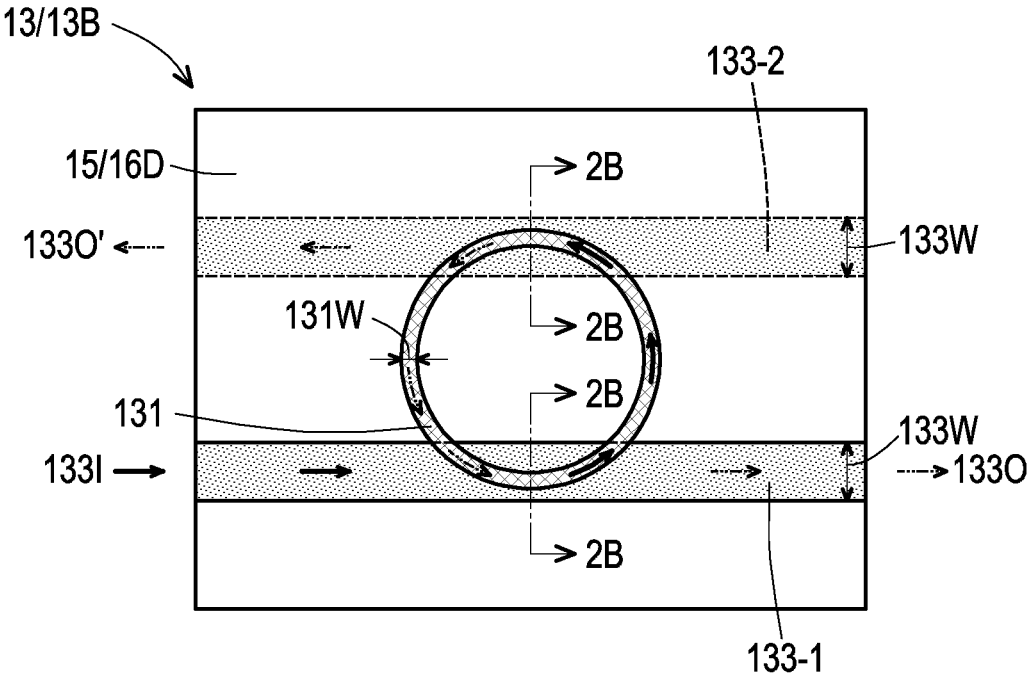
FIG. 2A illustrates a schematic top view of an optical device, in accordance with some embodiments.
Figure 2B:
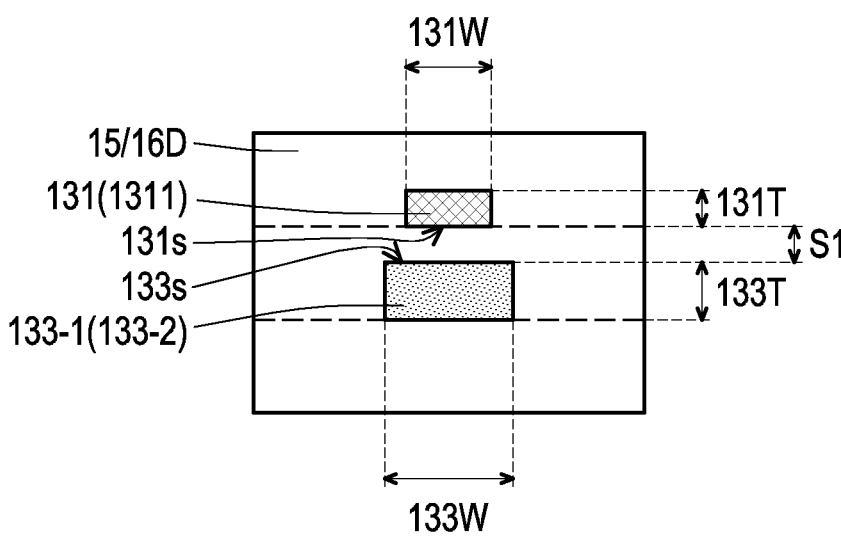
FIG. 2B illustrates a schematic cross-sectional view of the optical device taken along the line 2B-2B in FIG. 2A, in accordance with some embodiments.
Figure 2C:
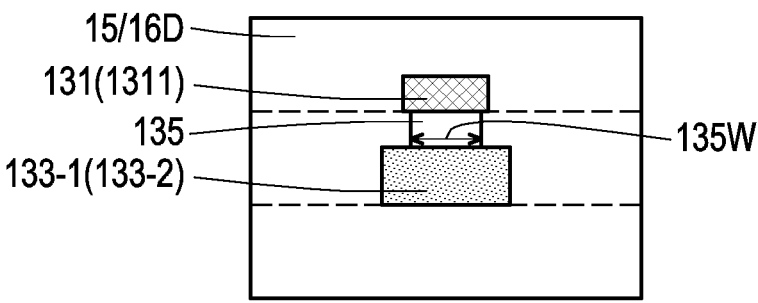
FIG. 2C illustrates a schematic cross-sectional view of a variation of the optical device taken along the line 2B-2B in FIG. 2A, in accordance with some embodiments.

FIG. 2A illustrates a schematic top view of the optical device, FIG. 2B illustrates a schematic cross-sectional view of the optical device taken along the line 2B-2B in FIG. 2A, and FIG. 2C illustrates a schematic cross-sectional view of a variation of the optical device taken along the line 2B-2B in FIG. 2A, in accordance with some embodiments. The optical device described in FIGS. 2A-2C may be the optical device 13 of the semiconductor device 10A shown in FIG. 1A or the optical device 13B of the semiconductor device 10B shown in FIG. 1B.

Referring to FIGS. 2A-2B and with reference to FIGS. 1A-1B, a ring waveguide 131 (also called a micro-ring resonator or an optical resonator) is optically coupled to at least one I/O waveguide (e.g., 133-1 and/or 133-2). In some embodiments, the I/O waveguides 133-1 and 133-2 are disposed at two opposing sides of the ring waveguide 131 and optically coupled to the ring waveguide 131. The I/O waveguide 133-2 is illustrated in the dashed lines to indicate it may or may not exist. The I/O waveguide(s) 133-1 and/or 133-2 may serve as input and output of light of various wavelengths into and out of the ring waveguide 131. In the top view, the regions that the ring waveguide 131 overlaps the I/O waveguides 133-1 and 133-2 may be viewed as optical coupling regions. In some embodiments where the ring waveguide 131 and the I/O waveguides 133-1 and 133-2 are included in the optical device 13 of the semiconductor device 10A, the ring waveguide 131 and the I/O waveguides 133-1 and 133-2 are embedded in the ILD layer 15. In some embodiments where the ring waveguide 131 and the I/O waveguides 133-1 and 133-2 are included in the optical device 13B of the semiconductor device 10B, the ring waveguide 131 and the I/O waveguides 133-1 and 133-2 are embedded in the interconnecting dielectric layer 16D.

In some embodiments where a single I/O waveguide 133-1 (or 133-2) is optically coupled to the ring waveguide 131, two opposing ends of the I/O waveguide 133-1 respectively provide the input and output to the ring waveguide 131. For example, when the light that meets the resonance condition enters the I/O waveguide 133-1 at the input end 133I and passes through the ring waveguide 131, the light intensity gradually increases due to constructive interference in the ring waveguide 131, and then the light outputs at the output end 133O. For example, the optical I/O portion 14 (as shown in FIGS. 1A-1B) is optically coupled to the input end 133I. In some embodiments where two I/O waveguides 133-1 and 133-2) are optically coupled to the ring waveguide 131, the I/O waveguide 133-1 provides the input and output to/from the ring waveguide 131 and the I/O waveguide 133-2 provides another output 133O' to the ring waveguide 131. The ring waveguide 131 and the I/O waveguide(s) 133-1 and/or 133-2 may operate as an optical filter, since only light of a specific wavelength may resonate in the ring waveguide 131.

The ring waveguide 131 may be arranged in a loop. In the illustrated embodiment, the ring waveguide 131 is a closed loop waveguide having a circular/annular top-view shape. The I/O waveguide(s) 133-1 and/or 133-2 may be a straight or linear waveguide. Other shapes of the ring waveguide 131 and the I/O waveguides 133-1 and 133-2 may be used depending on optical and product requirements. The resonance wavelengths may be changed by increasing (or decreasing) the radius of the ring waveguide 131 and/or a vertical distance between the ring waveguide 131 and the I/O waveguide(s) 133-1 and/or 133-2, and the ring waveguide 131 functioning as an optical filter may be considered tunable. In some embodiments, the ring waveguide 131 has a width 131W ranging from about 0.1 μm to about 1 μm. The I/O waveguide(s) 133-1 and/or 133-2 may have a width 133W greater than the width 131W of the ring waveguide 131. For example, the width 133W of the I/O waveguide(s) 133-1 and/or 133-2 is in a range of about 0.1 μm and about 5 μm. The I/O waveguides 133-1 and 133-2 may have substantially the same width 133W or may have different widths.

In some embodiments, the ring waveguide 131 and the I/O waveguides (133-1 and 133-2) are made of different materials. For example, the ring waveguide 131 is made of a semiconductor material such as silicon. Other semiconductor material (e.g., a group III material, a group V material, a compound semiconductor, an alloy semiconductor, or combinations thereof) may be used. The I/O waveguides (133-1 and 133-2) may be made of a dielectric material having a dielectric constant different from the ILD layer 15 (in the embodiments of the semiconductor device 10A) or different from the interconnecting dielectric layer 16D (in the embodiments of the semiconductor device 10B). The I/O waveguides 133-1 and 133-2 may be made of the same dielectric material. In alternative embodiments, the I/O waveguides 133-1 and 133-2 are made of different dielectric materials. For example, the I/O waveguides (133-1 and/or 133-2) may be made of a nitride such as silicon nitride. Other dielectric material (e.g., silicon oxide, silicon oxynitride, silicon carbon-nitride, silicon-carbon-oxynitride, the like, or a suitable dielectric material that provides reduced thermos-optic effects) may be used. The performance of the ring waveguide is sensitive to temperature variation. In some embodiments, the material of the I/O waveguide 133-1 (or 133-2) has the thermal conductivity higher than the material of the ring waveguide 131, and the thermal impact on the ring waveguide 131 is less than that of the I/O waveguide 133-1 (or 133-2) as the heat is applied.

In some embodiments, silicon nitride-on-insulator may be used to form the I/O waveguides (133-1 and 133-2) for integrated optics owing reduced thermo-optic effects, sensitivity to variations in waveguide. For example, the ring waveguide 131 and the I/O waveguides (133-1 and 133-2) are formed by patterning silicon nitride integrated onto a silicon-on-insulator (SOI) substrate. In some embodiments, forming the ring waveguide 131 and the I/O waveguides (133-1 and 133-2) includes: providing the SOI substrate which includes a silicon base layer, an oxide layer overlying the silicon base layer, and a silicon layer overlying the oxide layer; patterning the silicon layer to form the ring waveguide; removing the silicon base layer; forming a silicon nitride layer on a side of the oxide layer which was covered by the silicon base layer; patterning the silicon nitride layer to form the I/O waveguides; covering the I/O waveguides with a dielectric material (e.g., ILD layer or the interconnect dielectric layer); and disposing the semiconductor substrate on the dielectric material.

Still referring to FIG. 2B and with reference to FIG. 2A, the ring waveguide 131 and the I/O waveguide 133-1 optically coupled to each other in a vertical manner may be located in different dielectric sublayers. In some embodiments, the ring waveguide 131 is disposed above and spaced apart from the I/O waveguide 133-1. In the coupling region as shown in the cross-sectional view of FIG. 2B, the ring waveguide 131 overlaps the I/O waveguide 133-1. In some embodiments, the ring waveguide 131 has a thickness 131T ranging from about 0.1 μm to about 1 μm. The I/O waveguide 133-1 may have a thickness 133T ranging from about 0.1 μm to about 1 μm. In some embodiments, the I/O waveguide 133-1 is thicker than the ring waveguide 131. Alternatively, the ring waveguide 131 and the I/O waveguide 133-1 have substantially the same thickness.

In some embodiments of the semiconductor device 10A, the ILD layer 15 includes a plurality of sublayers illustrated in the dashed lines, the ring waveguide 131 is embedded in the upper sublayer distal from the semiconductor substrate 11 and the I/O waveguide 133-1 is embedded in the lower sublayer proximity to the semiconductor substrate 11, where the ring waveguide 131 is spatially separated from the I/O waveguide 133-1 through the ILD layer 15. One or more sublayer(s) may be disposed between the upper sublayer and the lower sublayer. Similarly, in some embodiments of the semiconductor device 10B, the ring waveguide 131 embedded in the upper sublayer of the interconnecting dielectric layer 16D is spatially separated from the I/O waveguide 133-1 embedded in the lower sublayer of the interconnecting dielectric layer 16D through one or more sublayer(s) of the interconnecting dielectric layer 16D.

The coupling coefficient may depend on the gap (or the vertical distance in the illustrated embodiments) between the I/O waveguide 133-1 and the ring waveguide 131. For example, a non-zero spacing S1 is between the I/O waveguide 133-1 and the ring waveguide 131, where the spacing S1 is a thickness of the portion of the ILD layer 15 (or the interconnecting dielectric layer 16D) vertically interposed between the I/O waveguide 133-1 and the ring waveguide 131. The spacing S1 may be measured between the top surface 133s of the I/O waveguide 133-1 and the bottom surface 131s of the ring waveguide 131. For example, the spacing S1 is in a range of about 0.01 μm and about 5 μm. The I/O waveguide 133-2 is optionally located in the same sublayer as the I/O waveguide 133-1 and may have the same (or similar) size as the I/O waveguide 133-1. The spacing between the I/O waveguide 133-2 and the ring waveguide 131 may be substantially equal to the spacing S1. Since the I/O waveguide 133-1 and the ring waveguide 131 are located in the different sublayers of the dielectric layer (e.g., the ILD layer or the interconnect dielectric layer), the spacing S1 between the I/O waveguide and the ring waveguide may be well-controlled by disposing the sublayer having a suitable thickness between the I/O waveguide 133-1 and the ring waveguide 131. In this manner, the coupling efficiency of the optical device may be improved. In addition, the I/O waveguide and the ring waveguide located in the different sublayers are optically coupled through the vertical coupling mechanism which has better coupling and loss characteristics, as compared to the horizontal coupling mechanism.

Referring to FIG. 2C and with reference to FIGS. 2A and 2B, the structure in the cross-sectional view of FIG. 2C is similar to the structure in the cross-sectional view of FIG. 2B, except that a medium 135 is disposed within the coupling region and vertically interposed between the I/O waveguide 133-1 and the ring waveguide 131. The medium 135, and the ring waveguide 131 may be laterally covered by the ILD layer 15 (in the embodiments of the semiconductor device 10A) or the interconnecting dielectric layer 16D (in the embodiments of the semiconductor device 10B). The material of the medium 135 may affect the optical coupling and the transmission of the light wave. In some embodiments, the medium 135 is made of a dielectric material having a dielectric constant different from the I/O waveguide 133-1 and also different from the ILD layer 15 (in the embodiments of the semiconductor device 10A) or the interconnecting dielectric layer 16D (in the embodiments of the semiconductor device 10B). The medium 135 may be a high refractive index medium or may be a lower refractive index medium (i.e., air/vacuum/other gas within gap at about 1), according to optical and product requirements. In some embodiments, the medium 135 is a cavity between the I/O waveguide 133-1 and the ring waveguide 131. In the cross section, the medium 135 may have a width 135W less than the width of the ring waveguide 131 and also less than the width of the I/O waveguide 133-1. In alternative embodiments, the width 135W of the medium 135 is substantially equal to that of the ring waveguide 131 or the I/O waveguide 133-1.

Figure 3A:
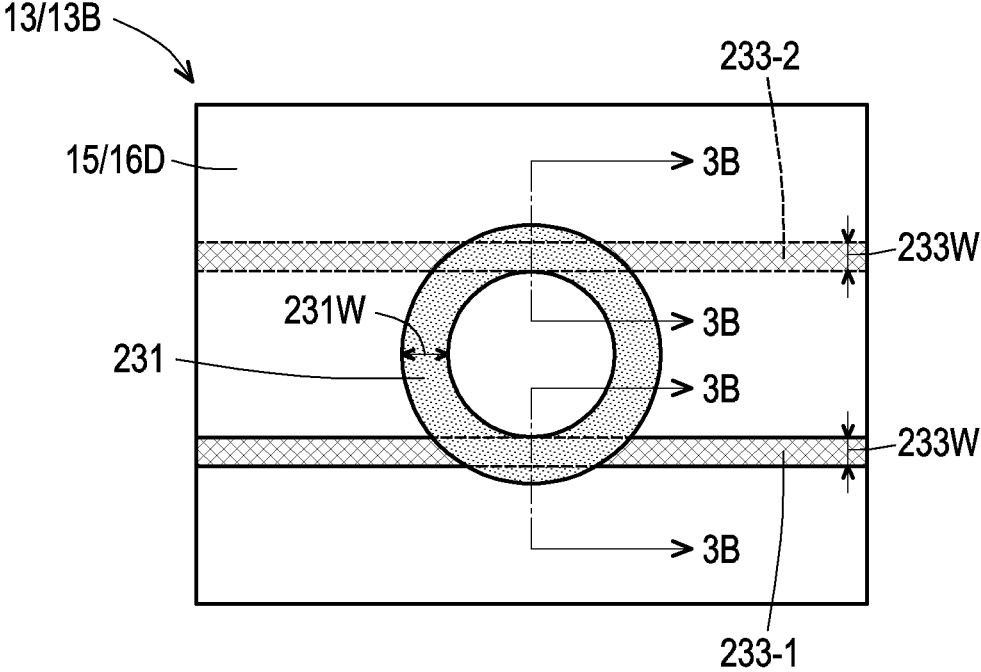
FIG. 3A illustrates a schematic top view of an optical device, in accordance with some embodiments.
Figure 3B:
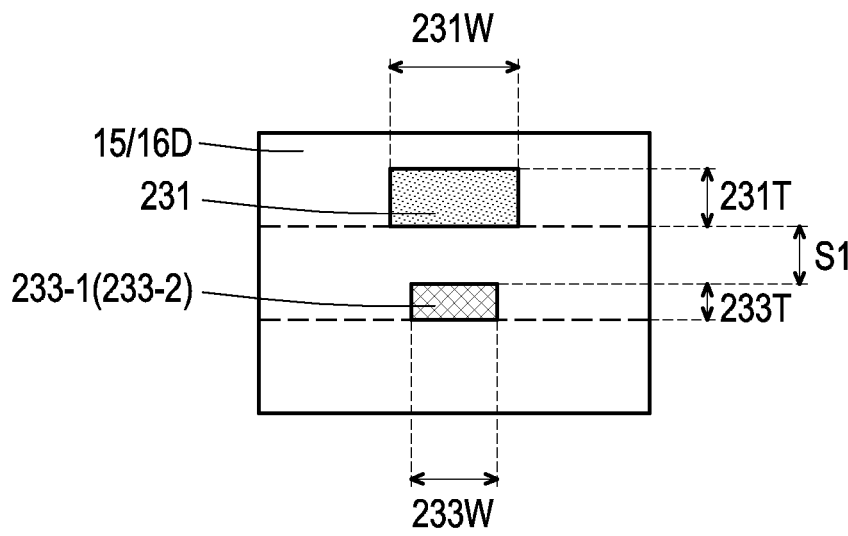
FIG. 3B illustrates a schematic cross-sectional view of the optical device taken along the line 3B-3B in FIG. 3A, in accordance with some embodiments.
Figure 3C:
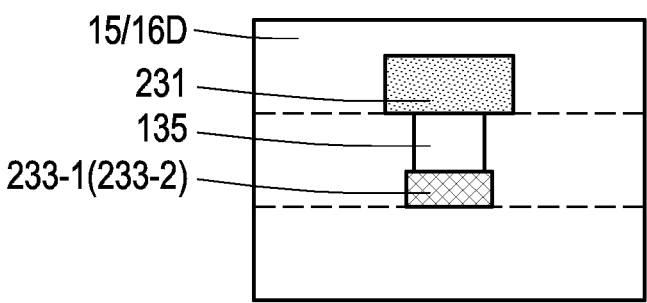
FIG. 3C illustrates a schematic cross-sectional view of a variation of the optical device taken along the line 3B-3B in FIG. 3A, in accordance with some embodiments.

FIG. 3A illustrates a schematic top view of an optical device, FIG. 3B illustrates a schematic cross-sectional view of the optical device taken along the line 3B-3B in FIG. 3A, and FIG. 3C illustrates a schematic cross-sectional view of a variation of the optical device taken along the line 3B-3B in FIG. 3A, in accordance with some embodiments. The optical device described in FIGS. 3A-3C may be the optical device 13 of the semiconductor device 10A shown in FIG. 1A or the optical device 13B of the semiconductor device 10B shown in FIG. 1B. Unless specified otherwise, like reference numerals in these embodiments represent like components in the embodiments shown in FIGS. 2A-2C.

Referring to FIGS. 3A-B and with reference to FIG. 2A, the structure shown in FIG. 3A is similar to the structure shown in FIG. 2A, except for the materials and the dimensions of the ring waveguide 231 and the I/O waveguides 233-1 and 233-2. For example, the ring waveguide 231 is made of a dielectric material, and the I/O waveguide(s) 233-1 (and/or 233-2) may be made of a semiconductor material. For example, the ring waveguide 231 is made of a nitride-containing material such as silicon nitride. Other dielectric material (e.g., silicon oxide, silicon oxynitride, silicon carbon-nitride, silicon-carbon-oxynitride, the like, or a suitable dielectric material that provides reduced thermos-optic effects) may be used. The I/O waveguide(s) 233-1 (and/or 233-2) may be made of silicon or other semiconductor material (e.g., a group III material, a group V material, a compound semiconductor, an alloy semiconductor, or the like), etc. The ring waveguide 231 may have a width 231W greater than a width 233W of the I/O waveguide(s) 233-1 (and/or 233-2). In some embodiments, the width 231W of the ring waveguide 231 ranges from about 0.1 μm to about 5 μm. The width 233W of the I/O waveguide(s) 233-1 and/or 233-2 is in a range of about 0.1 μm and about 1 μm.

Still referring to FIG. 3B and with reference to FIG. 3A and FIG. 2B, the ring waveguide 231 and the I/O waveguide 233-1 (or 233-1) located in different layers may be similar to the ring waveguide 131 and the I/O waveguide 133-1 described in FIG. 2B, except for the dimensions of the ring waveguide 231 and the I/O waveguide 233-1 (or 233-1). For example, the ring waveguide 231 has a thickness 231T greater than a thickness 233T of the I/O waveguide 233-1 (or 233-1). Alternatively, the ring waveguide 231 and the I/O waveguide 233-1 (or 233-1) have substantially the same thickness. The spacing S1 between the I/O waveguide 233-1 (or 233-1) and the ring waveguide 231 is non-zero. The spacing S1 may be controlled by the thickness of the portion of the dielectric layer (e.g., the ILD layer 15 or the interconnecting dielectric layer 16D) vertically interposed between the I/O waveguide 233-1 (or 233-2) and the ring waveguide 231.

Referring to FIG. 3C and with reference to FIG. 3B and FIG. 2C, the structure shown in FIG. 3C is similar to the structure shown in FIG. 3B, except that the medium 135 is vertically interposed between the I/O waveguide 233-1 (or 233-1) and the ring waveguide 231. The medium 135 is similar to the medium 135 described in FIG. 2C, and thus the detailed descriptions are not repeated for simplicity.

Figure 4A:
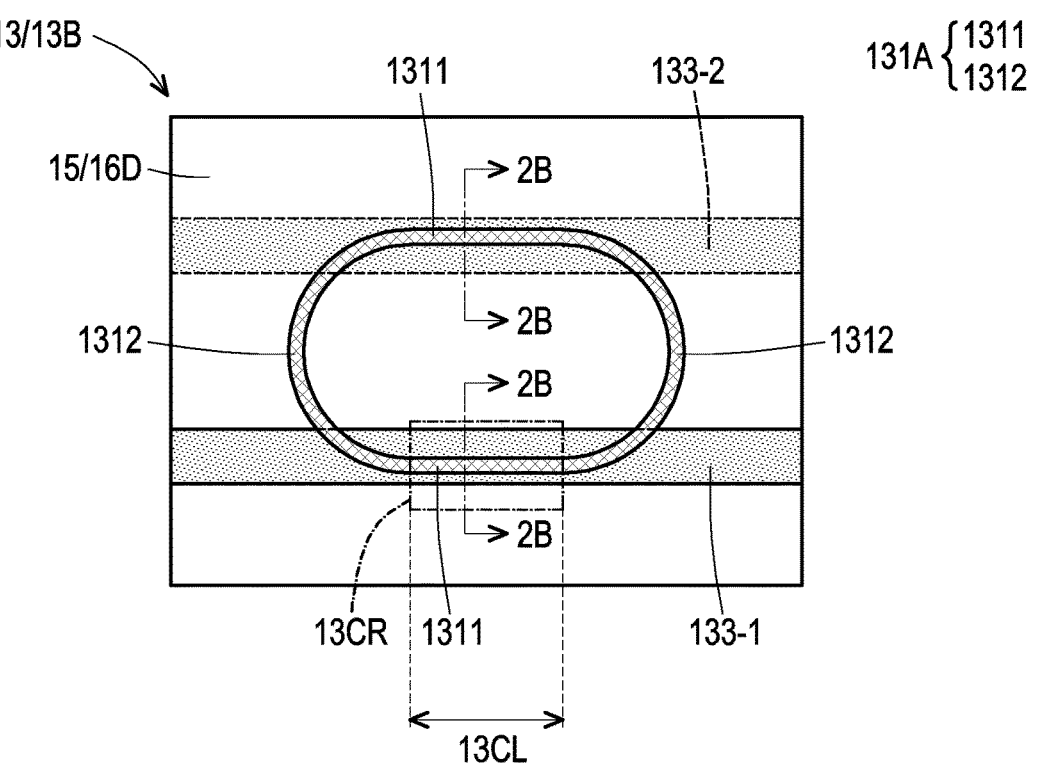
FIGS. 4A through 4C illustrate schematic top views of variations of an optical device, in accordance with some embodiments.
Figure 4B:
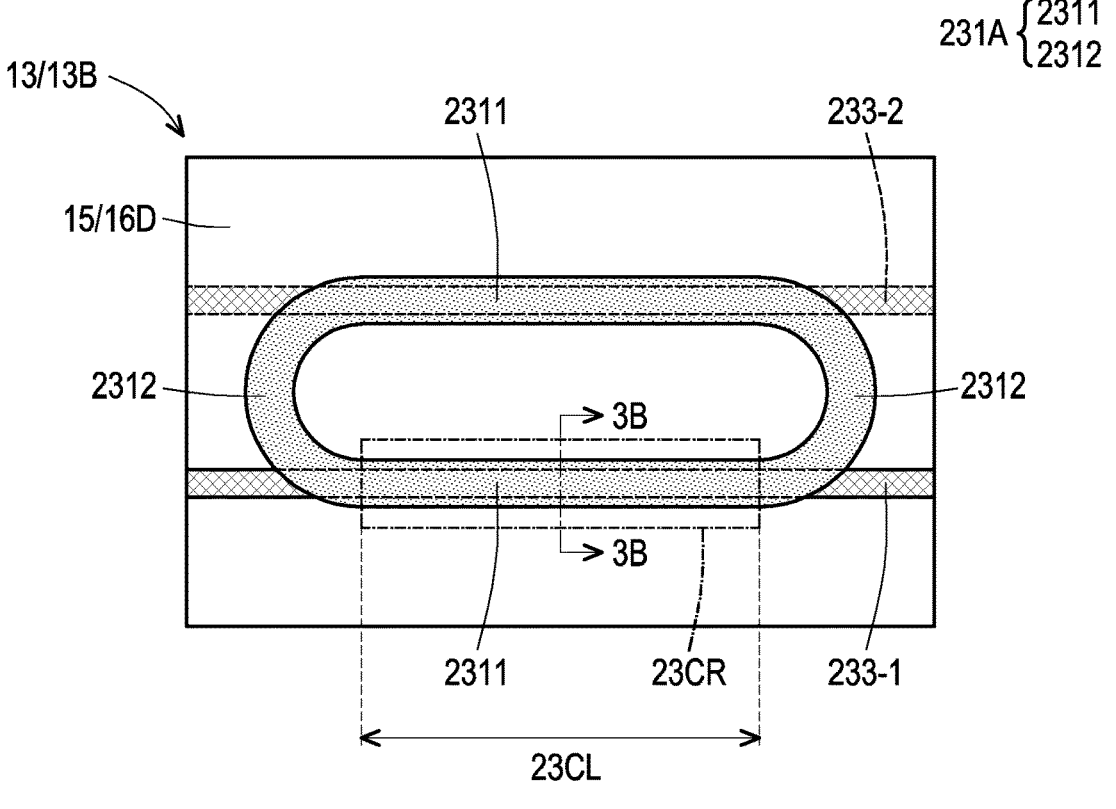
Figure 4C:
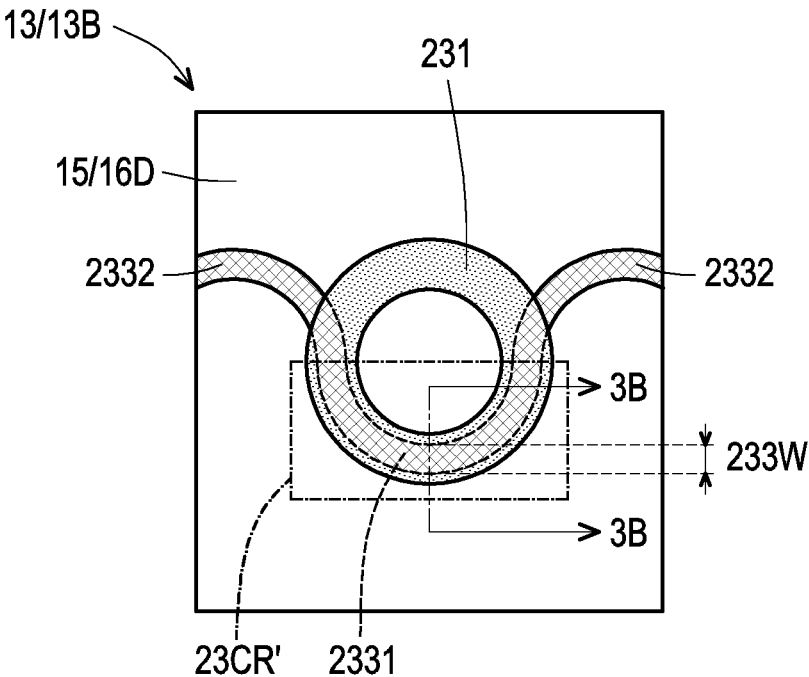

FIGS. 4A through 4C illustrate schematic top views of variations of an optical device, in accordance with some embodiments. The optical device described in FIGS. 4A-4C may be the optical device 13 of the semiconductor device 10A shown in FIG. 1A or the optical device 13B of the semiconductor device 10B shown in FIG. 1B. Unless specified otherwise, like reference numerals in the embodiments represent like components.

Referring to FIG. 4A and with reference to FIG. 2A, the structure shown in FIG. 4A is similar to the structure shown in FIG. 2A, except for the top-view shape of the ring waveguide. For example, the top-view shape of the ring waveguide 131A is an oval or elliptical shape. Other suitable closed-loop shape may be used. The ring waveguide 131A may include straight segments 1311 and arc segments 1312 connected to the straight segments 1311, where the straight segments 1311 overlapping the I/O waveguides are used for coupling light from I/O waveguides, and the arc segments 1312 are used for redirecting the light from/to straight segments 1311. The ring waveguide 131 shown in FIG. 2A may only include the arc segments directly connected to each other, not through the straight segments. It is understood that the coupling length affects the optical coupling. In the illustrated embodiment, the coupling length 13CL and the coupling region 13CR are increased as compared to the circular-shaped ring waveguide 131 in FIG. 2A. The resonance wavelengths may be changed by increasing (or decreasing) the radius of the arc segments, the ring waveguide 131A functioning as an optical filter may be considered tunable. In the top view, the ring waveguide 131A may have a substantially uniform width, where the range of the width of the ring waveguide 131A may be similar to that of the ring waveguide 131 described in FIG. 2A. The cross-sectional view of the coupling region of the ring waveguide 131A and the I/O waveguide 133-1 (or 133-2) may be the same as the cross-sectional view described in FIG. 2B (or FIG. 2C, in alternative embodiments).

Referring to FIG. 4B and with reference to FIG. 3A, the structure shown in FIG. 4B is similar to the structure shown in FIG. 3A, except for the top-view shape of the ring waveguide. For example, the top-view shape of the ring waveguide 231A is an oval or elliptical shape. Other suitable closed-loop shape may be used. The ring waveguide 231A may include straight segments 2311 and arc segments 2312 connected to the straight segments 2311, where the straight segments 2311 overlapping the I/O waveguides are used for coupling light from I/O waveguides, and the arc segments 2312 are used for redirecting the light from/to straight segments 2311. The ring waveguide 231 shown in FIG. 3A may only include the arc segments directly connected to each other, not through the straight segments. In the illustrated embodiment, the coupling length 23CL and the coupling region 23CR are increased as compared to the circular-shaped ring waveguide 231 in FIG. 3A. In the top view, the ring waveguide 231A may have a substantially uniform width, where the range of the width of the ring waveguide 231A may be similar to that of the ring waveguide 231 described in FIG. 3A. The cross-sectional view of the coupling region of the ring waveguide 231A and the I/O waveguide 233-1 (or 233-2) may be the same as the cross-sectional view described in FIG. 3B (or FIG. 3C, in alternative embodiments).

Referring to FIG. 4C and FIG. 3A, the structure shown in FIG. 4B is similar to the structure shown in FIG. 3A, except for the shape of the I/O waveguide. For example, the I/O waveguide 233-3 includes a first bent segment 2331 and second bent segments 2332 connected to the opposing ends of the first bent segment 2331, where the first bent segment 2331 is directly below the ring waveguide 231 and conformally overlaps the ring waveguide 231 in the coupling region 23CR'. In some embodiments, the two opposing ends of the first bent segment 2331 connected to the second bent segments 2332 are considered as the inflection points, where the first bent segment 2331 is a curve being concave upward and the second bent segments 2332 are curves being concave downward. In alternative embodiments, the first bent segment 2331 is a curve being concave downward and the second bent segments 2332 are curves being concave upward. Other shapes of the first and second bent segments may be used. The length of the first bent segment 2331 in the coupling region 23CR' may be appropriately sized depending on optical and product requirements. It is appreciated that the lengths of the coupling regions as illustrated in FIGS. 4A-4C are not necessarily to scale and are shown for explanation purposes. In the top view, the ring waveguide 231A may have a substantially uniform width, where the range of the width of the ring waveguide 231A may be similar to that of the ring waveguide 231 described in FIG. 3A. The cross-sectional view of the coupling region of the ring waveguide 231 and the I/O waveguide 233-3 may be the same as the cross-sectional view described in FIG. 3B (or FIG. 3C, in alternative embodiments).

Figure 5A:
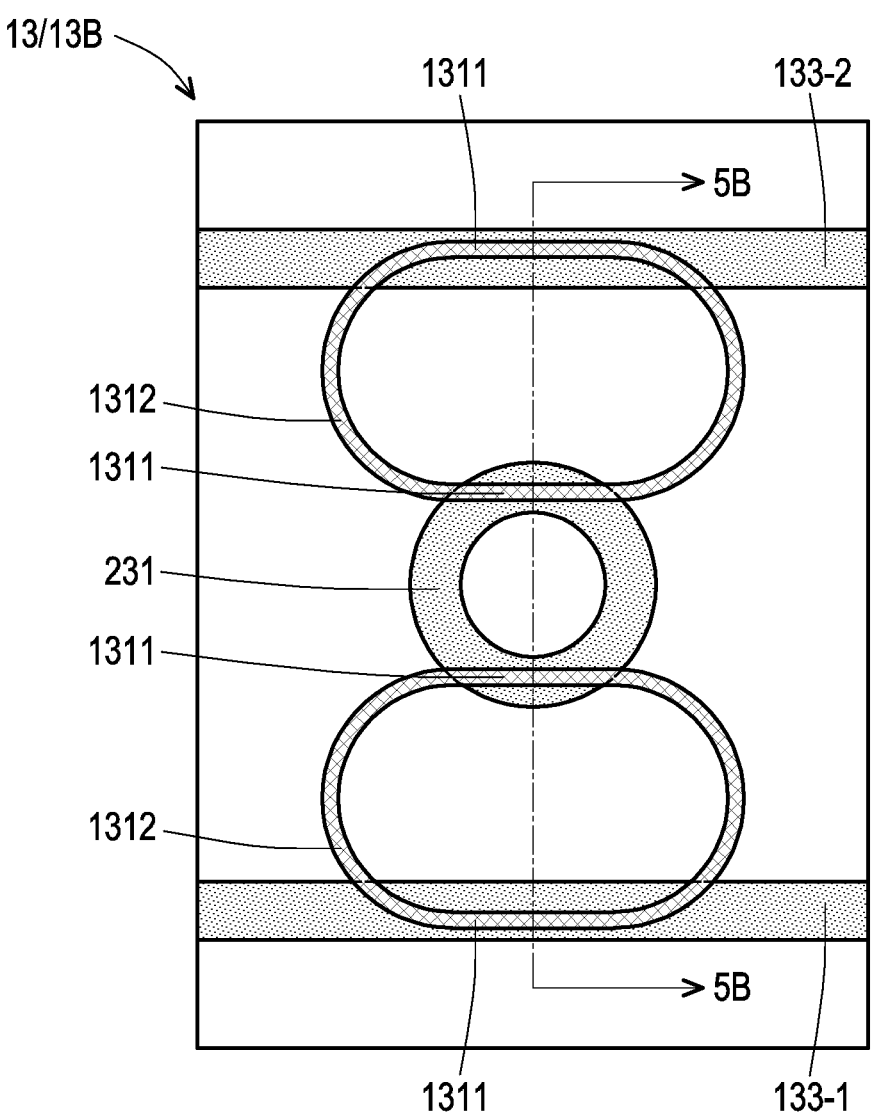
FIG. 5A illustrates a schematic top view of an optical device, in accordance with some embodiments.
Figure 5B:
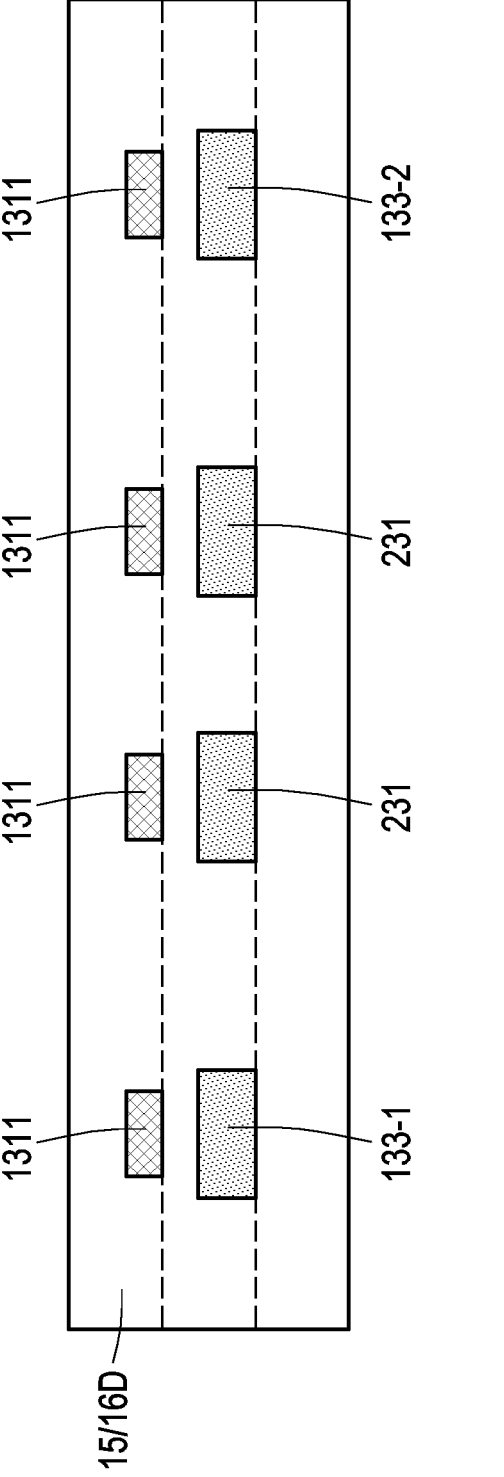
FIG. 5B illustrates a schematic cross-sectional view of the optical device taken along the line 5B-5B in FIG. 5A, in accordance with some embodiments.

FIG. 5A illustrates a schematic top view of an optical device, and FIG. 5B illustrates a schematic cross-sectional view of the optical device taken along the line 5B-5B in FIG. 5A, in accordance with some embodiments. The optical device described in FIGS. 5A and 5B may be the optical device 13 of the semiconductor device 10A shown in FIG. 1A or the optical device 13B of the semiconductor device 10B shown in FIG. 1B. Unless specified otherwise, like reference numerals in the embodiments represent like components.

Referring to FIGS. 5A-5B and with reference to FIGS. 2B, 3A, and 4A, the optical device 13/13B, in whole or in part, may be a wavelength division multiplexing (WDM) device. The WDM device may be used to combine multiple optical signals for transmission along the I/O waveguide(s) 133-1 and/or 133-2. For example, the WDM device includes more than one ring waveguides (e.g., 131A and 231) configured and operated to modulate the wavelengths. In some embodiments, the ring waveguides of the WDM device are made of the same material and may be located in the same sublayer. In some embodiments, the ring waveguides of the WDM device are made of different materials and located in different sublayers. In the illustrated embodiment, the WDM device includes two ring waveguides 131A and one ring waveguide 231 disposed below and optically coupled to the ring waveguides 131A. It should be understood that the number of the ring waveguides 131A and 231 is illustrated as an example and construes no limitation in the disclosure.

In some embodiments, the ring waveguides 131A are disposed at two opposing sides of the ring waveguide 231 in the top view, and the straight segment 1311 of each ring waveguide 131A may overlap the two opposing sides of the ring waveguide 231. The respective ring waveguide 131A may include one of the straight segments 1311 overlapping the ring waveguide 231 and the other one of the straight segments 1311 overlapping the I/O waveguide 133-1 (or 133-2). As shown in FIG. 5B, the I/O waveguides 133-1 and 133-2 and the ring waveguide 231 may be located in the lower sublayer, the ring waveguides 131A may be located in the upper sublayer, and a portion of the dielectric layer (e.g., the ILD layer 15 or the interconnect dielectric layer 16D) may be vertically interposed between the I/O waveguides 133-1 and 133-2 and the ring waveguide 231. The cross-sectional view illustrated in FIG. 5B may be similar to the structure described in FIG. 2B. In some embodiments, the medium may be interposed between the ring waveguides 131A and the I/O waveguides (133-1 and/or 133-2) or between the ring waveguides 131A and the ring waveguide 231, where the medium is similar to the medium 135 described in FIG. 2C.

In some embodiments, a part (or all) of the oval-like ring waveguides 131A may be replaced with the circular-like ring waveguide 131 described in FIG. 2A. In other embodiments, the I/O waveguide(s) 133-1 (and/or 133-2) may be replaced with the I/O waveguide 233-1 (or 233-2) described in FIGS. 3A-3B, and/or the ring waveguides 231 and 131A may be replaced with other ring waveguide(s) as described elsewhere herein. All such combinations are fully intended to be included within the scope of the embodiments. This provides flexibility in the design of the ring waveguide(s) and the I/O waveguide(s), since the design of the ring waveguide(s) and the I/O waveguide(s) may be easily integrated without incurring extra processing steps and cost.

Figure 6A:
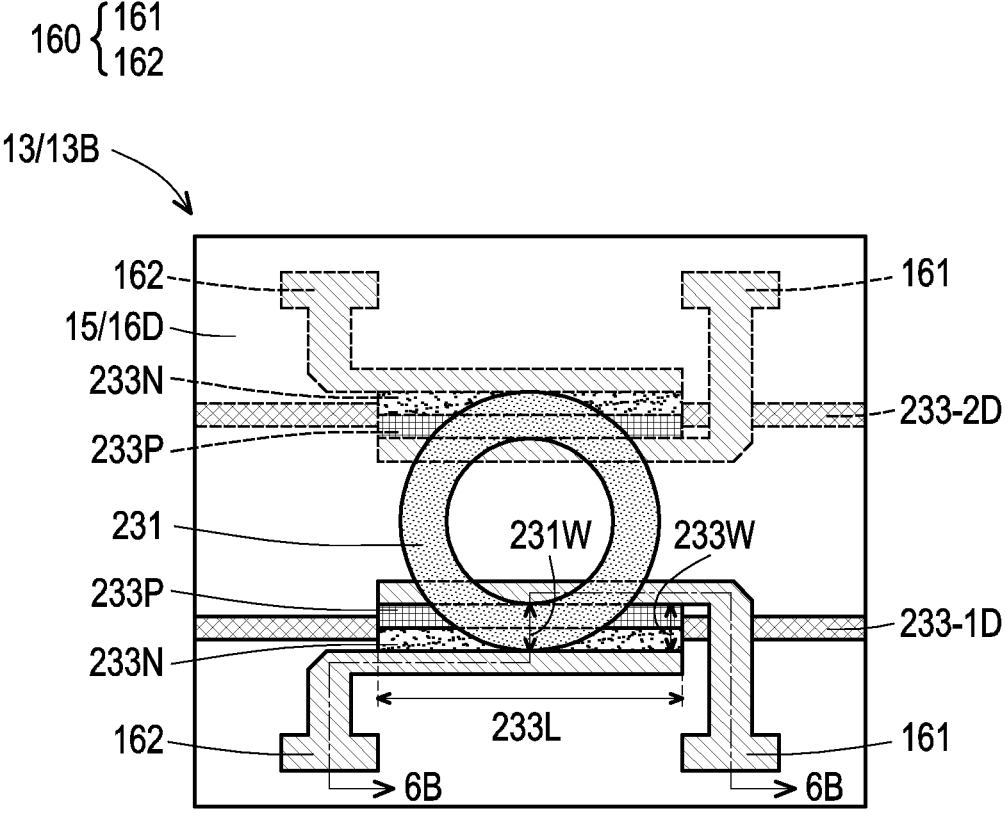
FIG. 6A illustrates a schematic top view of an optical device, in accordance with some embodiments.
Figure 6B:
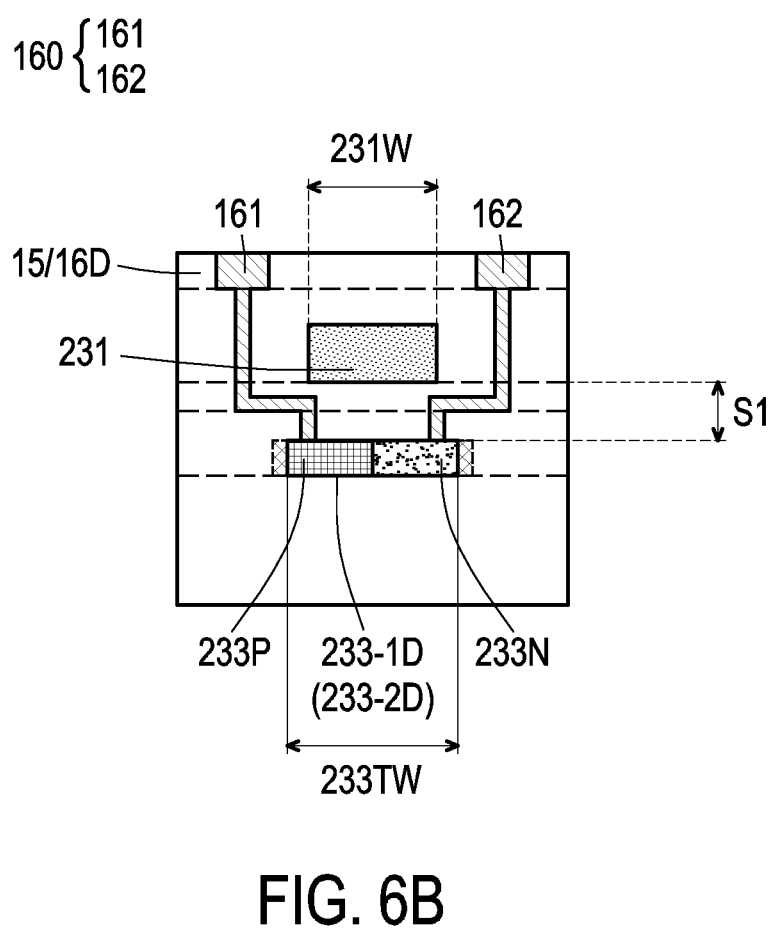

FIG. 6A illustrates a schematic top view of an optical device, and FIG. 6B illustrates a schematic cross-sectional view of the optical device taken along the line 6B-6B in FIG. 6A, in accordance with some embodiments. The optical device described in FIGS. 6A and 6B may be the optical device 13 of the semiconductor device 10A shown in FIG. 1A or the optical device 13B of the semiconductor device 10B shown in FIG. 1B. Unless specified otherwise, like reference numerals in the embodiments represent like components.

Referring to FIGS. 6A-6B and with reference to FIGS. 3A-3B, the ring waveguide 231 is optically coupled to at least one I/O waveguide (e.g., 233-1D and 233-2D). The ring waveguide 231 may be similar to the ring waveguide 231 described in FIGS. 3A-3B. The I/O waveguide 233-1D may be similar to the I/O waveguides 233-1 described in FIGS. 3A-3B, except that the I/O waveguide 233-1D includes doped regions having opposite conductivity types. For example, the I/O waveguide 233-1 includes a first doped region 233P having p-type dopants and a second doped region 233N adjoining the first doped region 233P and having n-type dopants. In the top view, the first and second doped regions 233P and 233N may each have a lengthwise direction parallel to the extending direction of the I/O waveguide 233-1D. In the top view, the first and second doped regions 233P and 233N may be vertically arranged and may tangentially overlap the ring waveguide 231. It is appreciated that the relative position of the first and second doped regions 233P and 233N as illustrated in FIGS. 6A-6B is shown for explanation purposes, and the relative position of the first and second doped regions 233P and 233N may be reversed, in other embodiments.

In the cross-sectional view, the doped regions (e.g., 233P and 233N) may occupy the entire cross section or a portion of the cross section of the I/O waveguide 233-1; therefore, the peripheral portion of the I/O waveguide 233-1 in the cross-sectional view of FIG. 6B is illustrated in the dashed lines to indicate it may or may not exist. In some embodiments, the first and second doped regions 233P and 233N of the I/O waveguide 233-1D overlap the ring waveguide 231 in the cross-sectional view, and a portion of the dielectric layer (e.g., the ILD layer 15 or the interconnect dielectric layer 16D) are located in the gap between the lower surface of the ring waveguide 231 and the upper surfaces of the first and second doped regions 233P and 233N, where the spacing S1 of the gap ranging from about 0.01 µm to about 5 µm. In alternative embodiments, the medium (not shown) is disposed in the gap between the lower surface of the ring waveguide 231 and the upper surfaces of the first and second doped regions 233P and 233N, where the medium is similar to the medium 135 described in FIG. 2C.

In some embodiments, the width 231W of the ring waveguide 231 is less than the total width 233TW of the first and second doped regions 233P and 233N. Alternatively, the width 231W is substantially equal to the total width 233TW. In the top view, the length 233L of the first doped region 233P may be substantially equal to that of the second doped region 233N. In some embodiments, the length 233L is similar to the coupling length and may be adjustable depending on the optical and product requirements. The doping concentration of the first and second doped regions 233P and 233N may be substantially the same or may be different, depending on the optical and product requirements. The first and second doped regions 233P and 233N are configured to change the refractive index of the I/O waveguide 233-1D to control the coupling efficiency between the I/O waveguide 233-1D and the ring waveguide 231.

Still referring to FIGS. 6A-6B, conductive features 160 including the first set (e.g., first electrode) 161 and the second set (e.g., second electrode) 162 are in physical and electrical contact with the first and second doped regions 233P and 233N, where each set of the conductive features 160 may include conductive pads, conductive vias, conductive lines, a combination thereof, etc. The conductive features 160 formed through the FEOL process may be embedded in the ILD layer 15. In some embodiments, the conductive features 160 formed through the BEOL process are embedded in the interconnecting dielectric layer 16D as part of the interconnect wiring 16M. In some embodiments, the conductive vias of the conductive features 160 landing on the first and second doped regions 233P and 233N are formed through the FEOL process and embedded in the ILD layer 15, and the other portion of the conductive features 160 overlying the conductive vias may be formed through the BEOL process and embedded in the interconnecting dielectric layer 16D.

The first and second doped regions 233P and 233N may be electrically connected to a voltage source (not shown) through the conductive features 160. For example, one of the first and second electrodes (161 and 162) is coupled to a positive terminal of the voltage source and the other one of the first and second electrodes (161 and 162) is coupled to a negative terminal of the of the voltage source. The conductive features 160 connected to the first and second doped regions 233P and 233N may provide a variable phase shift in the I/O waveguide 233-1D in response to the voltage applied to the first and second doped regions 233P and 233N. By changing the voltage applied between the first and second doped regions 233P and 233N, a coupling ratio between the ring waveguide 231 and the I/O waveguide 233-1D may be tuned.

The I/O waveguide 233-2D is optionally disposed at the opposing side of the ring waveguide 231, relative to the I/O waveguide 233-1D. The I/O waveguide 233-2D may be similar to the I/O waveguide 233-1D. The doped regions of the I/O waveguide 233-2D may be electrically coupled to the conductive features 160. The I/O waveguide 233-2D and the conductive features 160 connected to the doped regions of the I/O waveguide 233-2D are optionally disposed; therefore, these elements are illustrated in the dashed lines to indicate they may or may not exist.

Figure 7A:
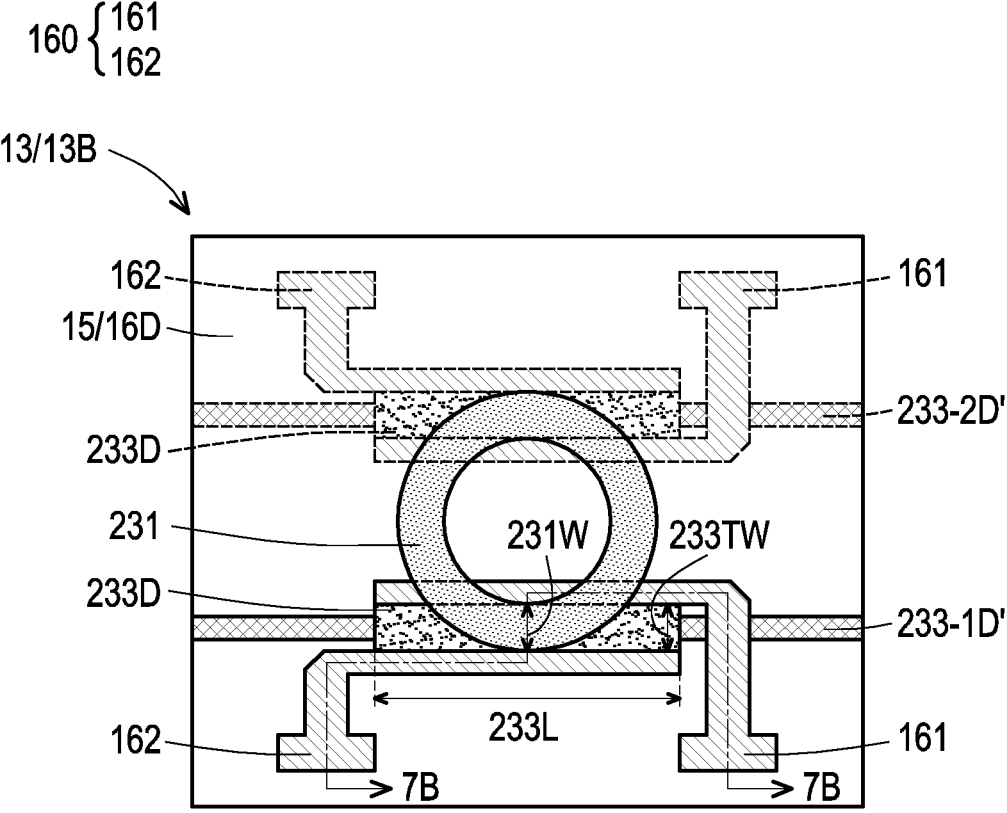
FIG. 7A illustrates a schematic top view of an optical device, in accordance with some embodiments.
Figure 7B:
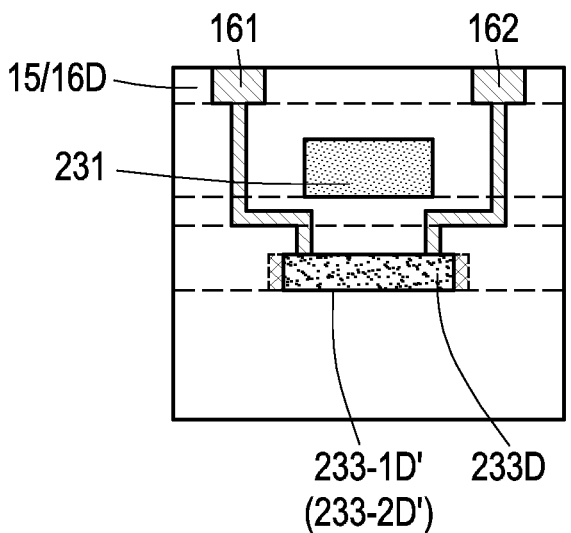
FIG. 7B illustrates a schematic cross-sectional view of the optical device taken along the line 7B-7B in FIG. 7A, in accordance with some embodiments.

FIG. 7A illustrates a schematic top view of an optical device, and FIG. 7B illustrates a schematic cross-sectional view of the optical device taken along the line 7B-7B in FIG. 7A, in accordance with some embodiments. The optical device described in FIGS. 7A and 7B may be the optical device 13 of the semiconductor device 10A shown in FIG. 1A or the optical device 13B of the semiconductor device 10B shown in FIG. 1B. Unless specified otherwise, like reference numerals in the embodiments represent like components.

Referring to FIGS. 7A-7B and with reference to FIGS. 6A-6B, the structures shown in FIGS. 7A-7B are similar to the structures shown in FIGS. 6A-6B, respectively. The difference therebetween includes that the I/O waveguide 233-1D' include a doped region 233D having either p-type dopants or n-type dopants. The doped region 233D may be electrically connected to a voltage source (not shown) through the conductive features 160. The doped region 233D of the I/O waveguide 233-1D' may serve as a resistive component as the voltage is applied on the doped region 233D. When the voltage is applied on the doped region 233D, the heat generated in the doped region 233D may heat up the I/O waveguide 233-1D', and the I/O waveguide 233-1D' may function as an electrical heater. By changing the voltage applied to the doped region 233D, a coupling ratio between the ring waveguide 231 and the I/O waveguide 233-1D' may be tuned. The I/O waveguide 233-2D' is optionally disposed at the opposing side of the ring waveguide 231, relative to the I/O waveguide 233-1D'. The I/O waveguide 233-2D may be similar to the I/O waveguide 233-1D'. The I/O waveguide 233-2D' and the conductive features 160 connected to the doped regions of the I/O waveguide 233-2D' are optionally disposed; therefore, these elements are illustrated in the dashed lines to indicate they may or may not exist.

Figure 8A:
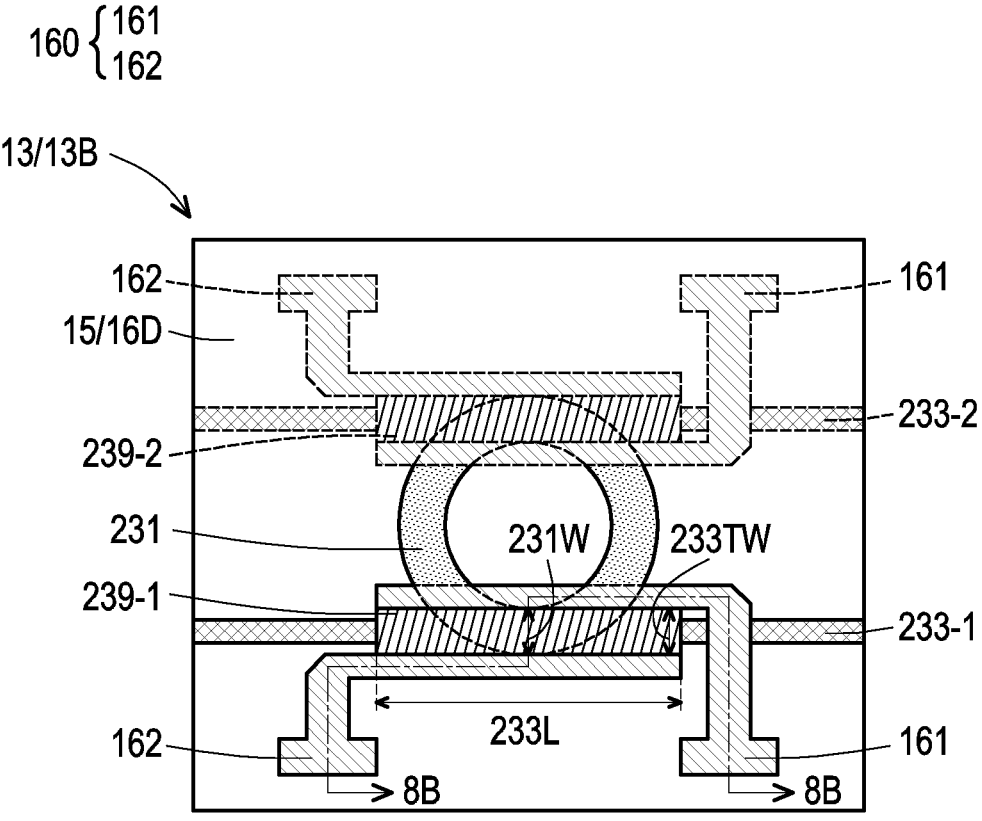
FIG. 8A illustrates a schematic top view of an optical device, in accordance with some embodiments.
Figure 8B:
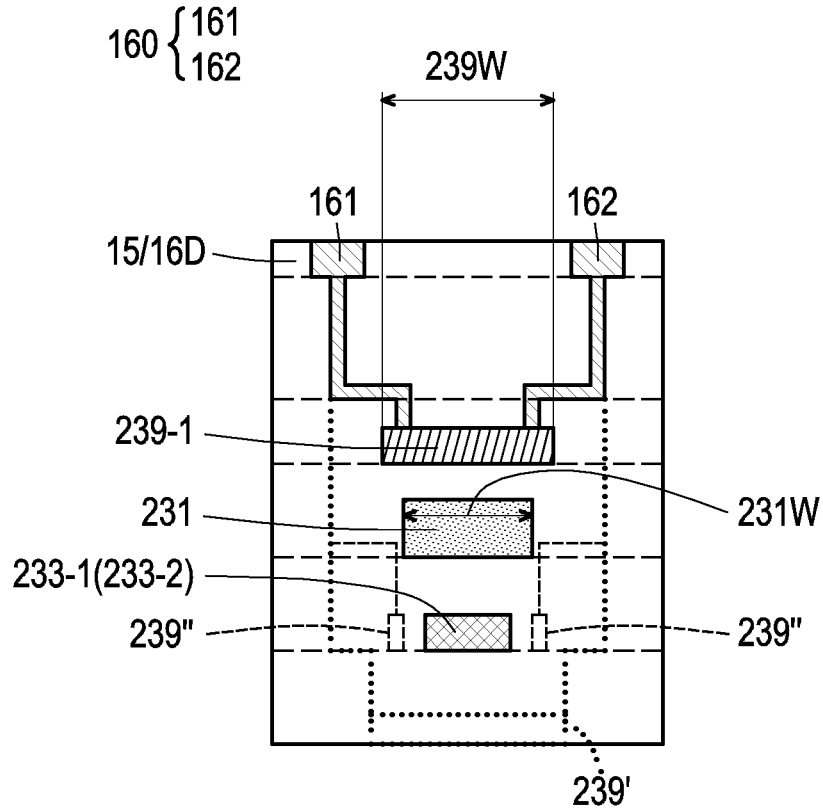
FIG. 8B illustrates a schematic cross-sectional view of the optical device taken along the line 8B-8B in FIG. 8A, in accordance with some embodiments.

FIG. 8A illustrates a schematic top view of an optical device, and FIG. 8B illustrates a schematic cross-sectional view of the optical device taken along the line 8B-8B in FIG. 8A, in accordance with some embodiments. The optical device described in FIGS. 8A and 8B may be the optical device 13 of the semiconductor device 10A shown in FIG. 1A or the optical device 13B of the semiconductor device 10B shown in FIG. 1B. Unless specified otherwise, like reference numerals in the embodiments represent like components.

Referring to FIGS. 8A and 8B and with reference to FIGS. 3A-3B, the structures shown in FIGS. 8A-8B are similar to the structures shown in FIGS. 3A-3B, respectively. The difference therebetween includes that a heating component 239-1 is thermally coupled to the I/O waveguide 233-1, and the conductive features 160 including the first set (e.g., first electrode) 161 and the second set (second electrode) 162 are electrically and physically connected to the heating component 239-1. In some embodiments, the heating component 239-1 is disposed over the ring waveguide 231 and embedded in the ILD layer 15 (or the interconnect dielectric layer 16D), and a portion of the ILD layer 15 (or the interconnect dielectric layer 16D) may be vertically interposed between the heating component 239-1 and the ring waveguide 231. The spacing between the lower surface of the heating component 239-1 and the upper surface of the ring waveguide 231 is the thickness of the portion of the ILD layer 15 (or the interconnect dielectric layer 16D), and the spacing between the heating component 239-1 and the ring waveguide 231 may vary depending on the optical and product requirements.

In some embodiments, the heating component 239-1 has a width 239W greater than the width 231W of the ring waveguide 231. Alternatively, the width 239W is substantially equal to (or less than) the width 231W of the ring waveguide 231. The heating component 239-1 may include a thermally conductive material such as aluminum, nickel, copper, stainless steel, alloys thereof and/or other suitable materials. In some other embodiments, the heating component (e.g., 239' as shown in FIG. 8B) is disposed below and thermally coupled to the I/O waveguide 233-1. In some other embodiments, the heating component (e.g., 239'' as shown in FIG. 8B) surrounds at least one sidewall of the I/O waveguide 233-1 and is thermally coupled to the I/O waveguide 233-1. The I/O waveguide 233-2 is optionally disposed as mentioned in FIGS. 3A-3B. The heating component 239-2 is optionally disposed to be thermally coupled to the I/O waveguide 233-2, and the conductive features 160 including the first and second sets 161 and 162 are optionally connected to the heating component 239-2. Other configuration of the heating component 239-1 may be employed.

In some embodiments, a voltage source (not shown) is connected to the conductive features 160. When the voltage is applied, the heat generated by the induced current flowing through the heating component 239-1 may affect the optical properties of the I/O waveguide 233-1. For example, the material of the I/O waveguide 233-1 has the thermal conductivity higher than the material of the ring waveguide 231, such that when the heat is generated by applying the voltage to the heat component 239-1, the thermal impact on the ring waveguide 231 is less than that of the I/O waveguide 233-1. In some embodiments, the heating of the I/O waveguide 233-1 changes index of refraction through a thermo-optic effect. For example, the effective index difference between the I/O waveguide 233-1 and the dielectric layer (e.g., 15 or 16D) covering the I/O waveguide 233-1 becomes close to the effective index difference between the ring waveguide 231 and the dielectric layer (e.g., 15 or 16D) covering the ring waveguide 231.

Figure 9A:
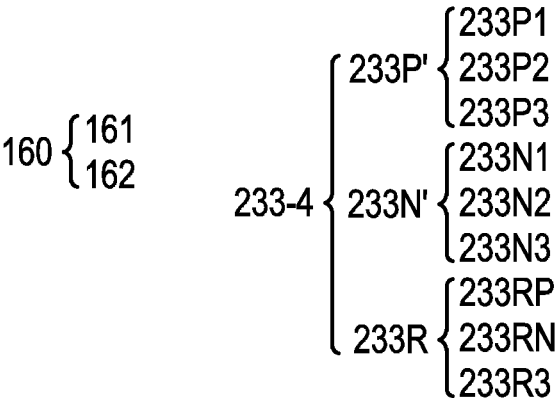
FIG. 9A illustrates a schematic top view of an optical device, in accordance with some embodiments.
Figure 9A:
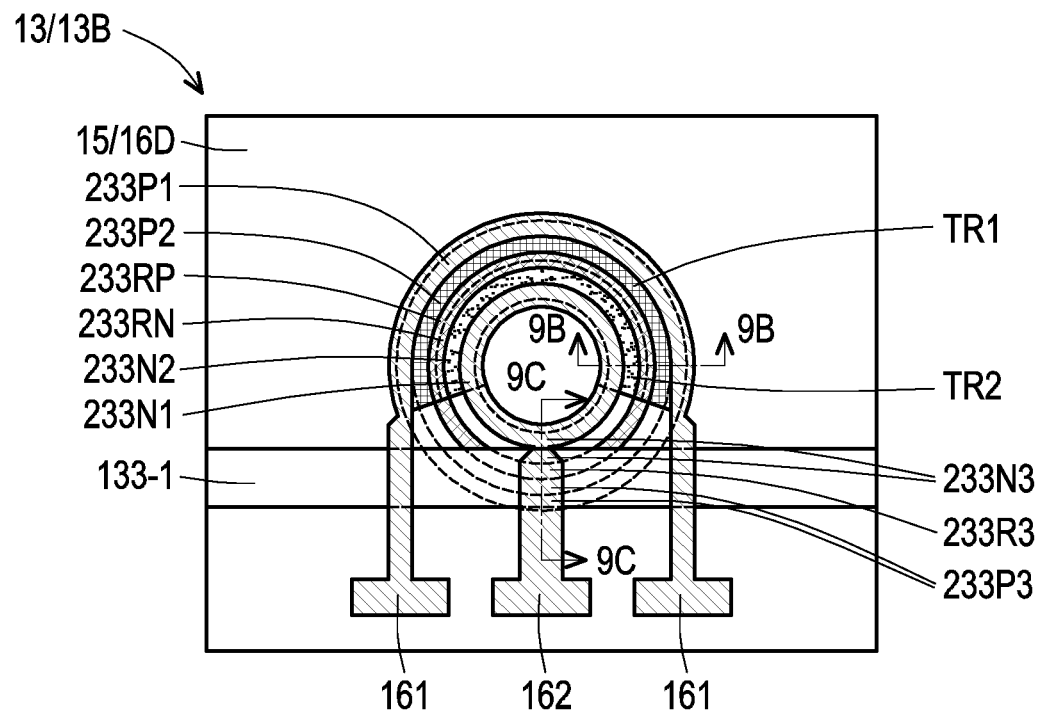
Figure 9B:
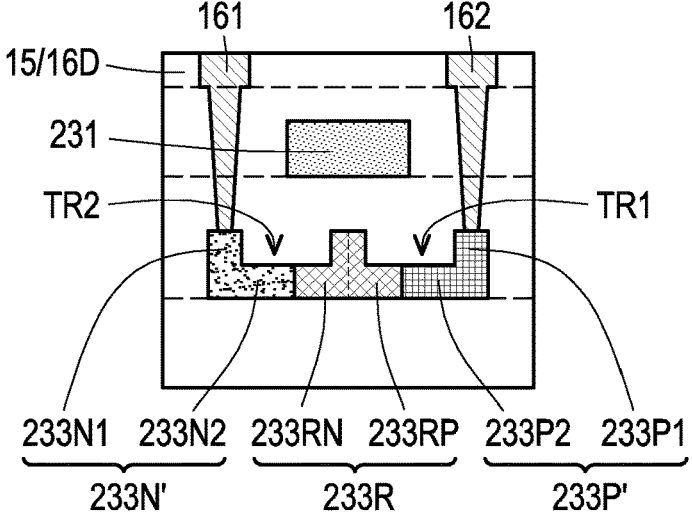
FIG. 9B illustrates a schematic cross-sectional view of the optical device taken along the line 9B-9B in FIG. 9A, in accordance with some embodiments.
Figure 9C:
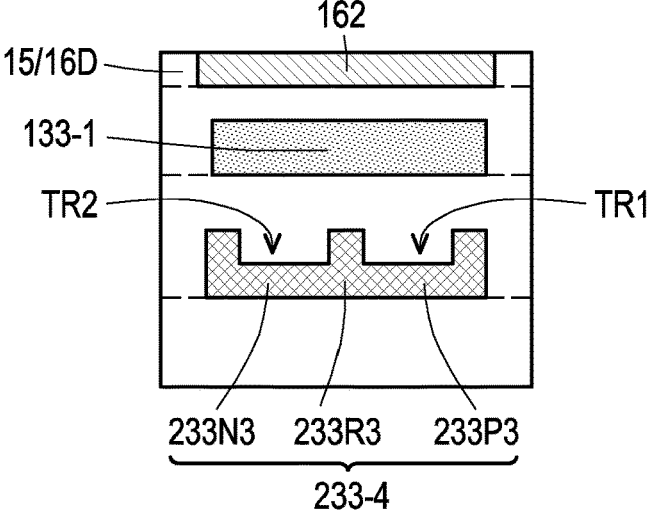
FIG. 9C illustrates a schematic cross-sectional view of the optical device taken along the line 9C-9C in FIG. 9A, in accordance with some embodiments.

FIG. 9A illustrates a schematic top view of an optical device, FIG. 9B illustrates a schematic cross-sectional view of the optical device taken along the line 9B-9B in FIG. 9A, and FIG. 9C illustrates a schematic cross-sectional view of the optical device taken along the line 9C-9C in FIG. 9A, in accordance with some embodiments. The optical device described in FIGS. 9A-9C may be the optical device 13 of the semiconductor device 10A shown in FIG. 1A or the optical device 13B of the semiconductor device 10B shown in FIG. 1B. Unless specified otherwise, like reference numerals in the embodiments represent like components.

Referring to FIGS. 9A-9C, the optical device 13/13B may be a micro-ring modulator (MRM) device which serves for a high-performance electrical to optical signal conversion. For example, the MRM device includes the ring waveguide 233-4 optically coupled to the I/O waveguide 133-1, the coupling region of the MRM device may lead the input optical signal having operating wavelength into the ring waveguide 233-4. The ring waveguide 233-4 may include a rib region 233R made of a semiconductor material (e.g., silicon, III-V compound semiconductors, or the like), a first doped region 233P' disposed at the external rim of the rib region 233R, and a second doped region 233N' disposed at the internal rim of the rib region 233R, where the rib region 233R is disposed in the middle to achieve resonant effect along with the resonant mode. The rib region 233R, the first doped region 233P', and the second doped region 233N' may form a P-I-N junction.

The rib region 233R may have an annular top-view shape. The first and second doped regions 233P' and 233N' may have a substantially annular top-view shape conformally lining the rib region 233R. The first and second doped regions 233P' and 233N' may have opposite conductivity types, for example, the first doped region 233P' has the p-type dopants and the second doped region 233N' has the n-type dopants. Alternatively, the p-type and n-type dopants of the first and second doped regions may be reversed. In some embodiments, the ring waveguide 233-4 is formed by: patterning a semiconductor material layer to form a first trench TR1 and a second trench TR2 surrounded by the first trench TR1; and doping the semiconductor material layer.

In some embodiments, the first doped region 233P' includes a first segment 233P1 and a second segment 233P2 between the first segment 233P1 and the rib region 233R, where the second segment 233P2 corresponds to the first trench TR1 and the first segment 233P1 is protruded from the second segment 233P2. The second doped region 233N' may include a first segment 233N1 and a second segment 233N2 between the first segment 233N1 and the rib region 233R, where the second segment 233N2 corresponds to the second trench TR2 and the first segment 233N1 is protruded from the second segment 233N2. The rib region 233R may include a first segment 233RP adjoining the first doped region 233P' and a second segment 233RN adjoining the second doped region 233N'. A first portion of the first segment 233RP immediately adjacent to the second segment 233P2 may correspond to the first trench TR1, and the second portion of the first segment 233RP immediately adjacent to the second segment 233RN is protruded from the first portion of the first segment 233RP. A first portion of the second segment 233RN immediately adjacent to the second segment 233N2 may correspond to the second trench TR2, and the second portion of the second segment 233RN immediately adjacent to the first segment 233RP is protruded from the first portion of the second segment 233RN. In some embodiments, the first segment 233RP includes dopants of the conductivity type same as the first doped region 233P' and has a doping concentration less than the first doped region 233P', and the second segment 233RN includes dopants of the conductivity type same as the second doped region 233N' and has a doping concentration less than the second doped region 233N'. The first and second doped regions 233P' and 233N' may be heavily doped regions and the rib region 233R may be a lightly doped region.

As shown in the cross-sectional view of FIG. 9C, the I/O waveguide 133-1 may be vertically disposed over the ring waveguide 233-4, and the ILD layer 15 (or the interconnect dielectric layer 16D) may be interposed therebetween. The ring waveguide 233-4 may have a first undoped region 233P3 connected to the first doped region 233P', a second undoped region 233R3 connected to the rib region 233R, and a third undoped region 233N3 connected to the second doped region 233N'. The I/O waveguide 133-1 may overlap the first, second, and third undoped regions 233P3, 233R3, and 233N3.

In some embodiments, the conductive features 160 including the first set (e.g., first electrode) 161 and the second set (e.g., second electrode) 162 are in physical and electrical contact with the first and second doped regions 233P' and 233N'. The conductive features 160 formed through FEOL process may be embedded in the ILD layer 15. In some embodiments, the conductive features 160 formed through BEOL process are embedded in the interconnecting dielectric layer 16D as part of the interconnect wiring 16M. In some embodiments, the conductive vias of the conductive features 160 landing on the first and second doped regions 233P' and 233N' are formed through the FEOL process and embedded in the ILD layer 15, and the other portion of the conductive features 160 overlying the conductive vias may be formed through the BEOL process and embedded in the interconnecting dielectric layer 16D. The first and second doped regions 233P' and 233N' may be electrically connected to a voltage source (not shown) through the conductive features 160. A change in the index of refraction of the ring waveguide 233-4 may be induced through electrical current injection. For example, when the voltage is applied, the resonant property of the ring waveguide 233-4 corresponding to an operating wavelength is changed by controlling free carriers. The transmittance of an input light in the I/O waveguide 133-1 may thus change along with the resonant state so that modulating an optical signal through the resonant effect to a particular wavelength may be achieved.

Figure 10A:
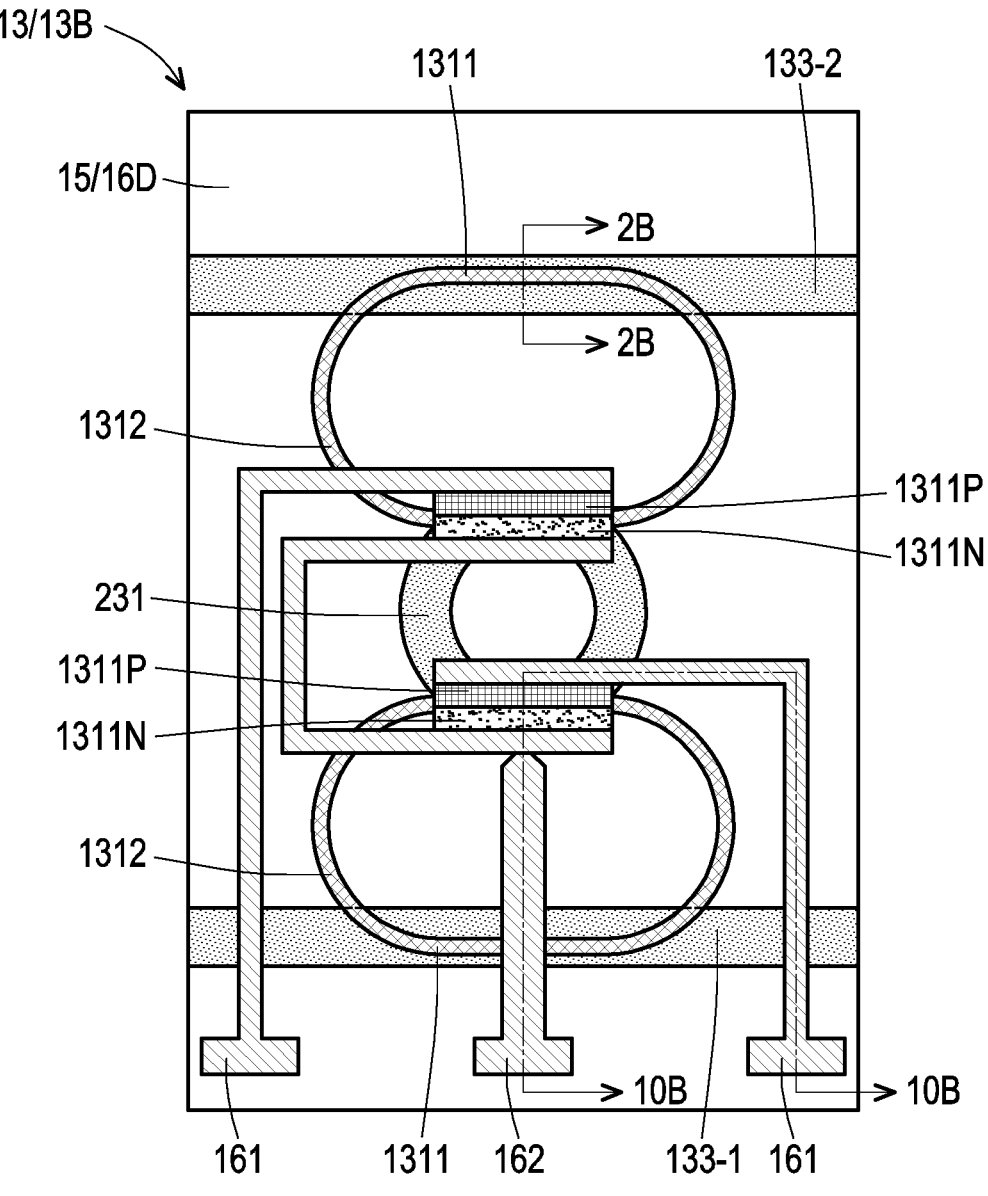
FIG. 10A illustrates a schematic top view of an optical device, in accordance with some embodiments.
Figure 10B:
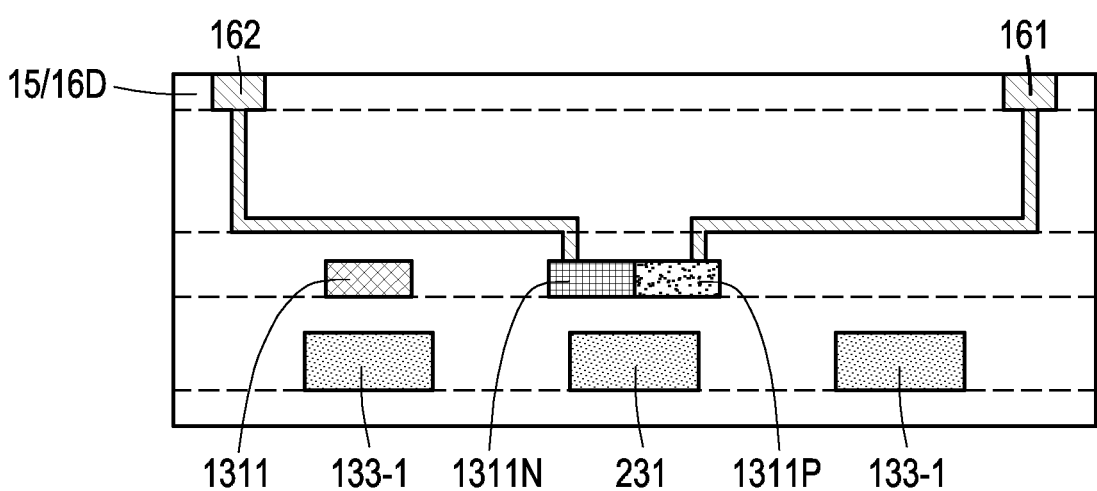
FIG. 10B illustrates a schematic cross-sectional view of the optical device taken along the line 10B-10B in FIG. 10A, in accordance with some embodiments.

FIG. 10A illustrates a schematic top view of an optical device, and FIG. 10B illustrates a schematic cross-sectional view of the optical device taken along the line 10B-10B in FIG. 10A, in accordance with some embodiments. The optical device described in FIGS. 10A and 10B may be the optical device 13 of the semiconductor device 10A shown in FIG. 1A or the optical device 13B of the semiconductor device 10B shown in FIG. 1B. Unless specified otherwise, like reference numerals in the embodiments represent like components.

Referring to FIGS. 10A-10B and with reference to FIGS. 5A-5B, the structure shown in FIG. 10A may be similar to the WDM device shown in FIG. 5A. The difference therebetween includes that the ring waveguides 131A in FIG. 5A are replaced with the ring waveguides 131D with doped regions (e.g., 1311N and 1311P) and the conductive features 160 are electrically coupled to the doped regions having opposite conductivity types. For example, the respective ring waveguide 131D includes the straight segment 1311' which has a first doped region 1311P and a second doped region 1311N. The first doped region 1311P may include the p-type dopants and the second doped region 1311N may have the n-type dopants. Alternatively, the p-type and n-type dopants of the first and second doped regions may be reversed. The first and second doped regions 1311P and 1311N may be located in the coupling region of the ring waveguides 231 and 131D.

In some embodiments, the first set (e.g., first electrode) 161 of the conductive features 160 is in physical and electrical contact with the first doped region 1311P, and the second set (e.g., second electrode) 162 of the conductive features 160 is in physical and electrical contact with the second doped region 1311N. In some embodiments, the second doped regions 1311N of the upper ring waveguide 131D and the lower ring waveguide 131D are connected in series through the second set 162 of the conductive features 160. In some embodiments, the first doped regions 1311P of the upper ring waveguide 131D and the lower ring waveguide 131D are respectively connected to two separate first sets 161 of the conductive features 160. Other suitable electrical configuration may be employed depending on product requirements. The first and second doped regions 1311P and 1311N may be electrically connected to a voltage source (not shown) through the conductive features 160. By changing the voltage applied between the first and second doped regions 1311P and 1311N, a coupling ratio between the ring waveguide 231 and 131D may be tuned.

Figure 11:
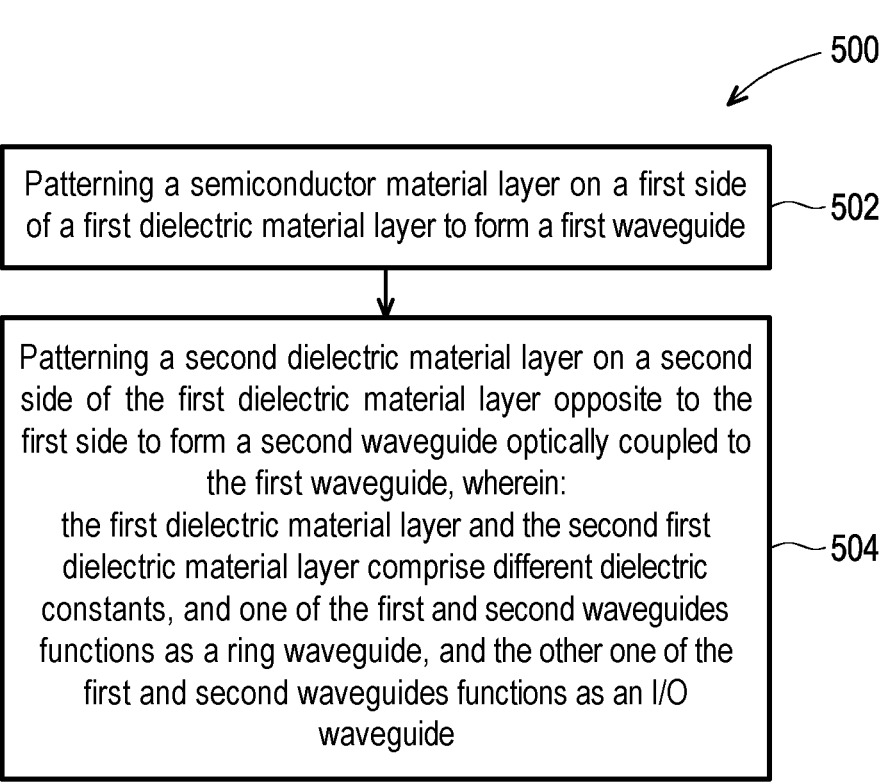
FIG. 11 is a flowchart illustrating steps of a method for fabricating an optical device, in accordance with some embodiments.

FIG. 11 is a flowchart illustrating steps of a method 500 for fabricating an optical device (e.g., 13 in FIG. 1A or 13B in FIG. 1B), in accordance with some embodiments. Referring to FIG. 11, the method 500 may include the following steps. In the step 502, a semiconductor material layer provided on a first side of a first dielectric material layer is patterned to form a first waveguide. In the step 504, a second dielectric material layer provided on a second side of the first dielectric material layer opposite to the first side is patterned to form a second waveguide optically coupled to the first waveguide. The first dielectric material layer and the second first dielectric material layer may include different dielectric constants. In some embodiments where the method 500 for forming the optical device 13 in FIG. 1A is provided, the first dielectric material layer is a part of the ILD layer 15, the second dielectric material layer may be a nitride-containing material (e.g., silicon nitride) or other suitable dielectric material, and the steps 502 and 504 are performed through the FEOL processes. In some embodiments where the method 500 for forming the optical device 13B in FIG. 1B is provided, the first dielectric material layer is a part of the interconnect dielectric layer 16D, the second dielectric material layer may be a nitride-containing material (e.g., silicon nitride) or other suitable dielectric material, and the steps 502 and 504 are performed through the BEOL processes.

In some embodiments, nitride-on-insulator may be used to form the second waveguide for integrated optics owing reduced thermo-optic effects, sensitivity to variations in waveguide. For example, the first and second waveguides formed by patterning a nitride-containing material integrated onto a SOI substrate may include the following steps. A substrate including a base layer, a first dielectric material layer overlying the base layer, and a semiconductor layer overlying a first side of the first dielectric material layer is provided. The semiconductor layer is patterned to form the first waveguide, and then the base layer may be removed to expose a second side of the oxide layer opposite to the first side. The second dielectric material layer may be formed and patterned on the second side of the oxide layer to form the second waveguide. The first and second waveguides may then be covered by another first dielectric material layer. The second waveguide may be at one side of the another first dielectric material layer, and the semiconductor substrate may be at the opposing side of the another first dielectric material layer.

In some embodiments, the first waveguide functions as a ring waveguide (e.g., micro-ring resonator) and the second waveguide functions as an I/O waveguide. Exemplary implementations of such embodiments are described with regard to FIGS. 2A-2C, FIG. 4A, FIGS. 5A-5B, FIGS. 9A-9B, and FIGS. 10A-10B. In the embodiments of FIGS. 5A-5B, during the step of forming the second waveguide (i.e. the I/O waveguides 133-1 and 133-2), the second dielectric material layer is also patterned to form the ring waveguide 231, such that the ring waveguide 231 and the I/O waveguides 133-1 and 133-2 are formed by the same material at the same level. In the embodiments of FIGS. 9A-9B and FIGS. 10A-10B, doping the semiconductor material layer may be performed to form the doped regions 233P' and 233N', and the conductive features 160 may be formed after forming the second waveguide.

In some embodiments, the first waveguide functions as an I/O waveguide and the second waveguide functions as a ring waveguide. Exemplary implementations of such embodiments are described with regard to FIGS. 3A-3C, FIGS. 4B-4C, FIGS. 6A-6B, FIGS. 7A-7B, and FIGS. 8A-8B. In the embodiments of FIGS. 6A-6B and FIGS. 7A-7B, doping the semiconductor material layer may be performed to form the doped region(s) (e.g., 233P and 233N in FIGS. 6A-6B or 233D in FIGS. 7A-7B), and the conductive features 160 may be formed after forming the second waveguide. In the embodiments of FIGS. 8A-8B, the heating component 239-1 may be formed after forming the second waveguide.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

According to some embodiments, a device includes a dielectric layer including a first material, a ring waveguide embedded in the dielectric layer, and an I/O waveguide embedded in the dielectric layer and optically coupled to the ring waveguide in a vertical manner. The ring waveguide includes a second material different from the first material, and the I/O waveguide includes a third material different from the first and second materials.

According to some alternative embodiments, a device includes an optical device disposed over a semiconductor substrate and embedded in a dielectric layer overlying the semiconductor substrate. The optical device includes a first waveguide arranged in a loop, and a second waveguide optically coupled to the first waveguide and including a material different from a material of the first waveguide. A vertical distance between the first and second waveguides is a thickness of a portion of the dielectric layer interposed between the first and second waveguides. The device includes an optical I/O portion laterally adjoining the optical device and optically coupled to the second waveguide.

According to some alternative embodiments, a method includes patterning a semiconductor material layer on a first side of a first dielectric material layer to form a first waveguide; and patterning a second dielectric material layer on a second side of the first dielectric material layer opposite to the first side to form a second waveguide optically coupled to the first waveguide. The first dielectric material layer and the second first dielectric material layer comprise different dielectric constants, and one of the first and second waveguides functions as a ring waveguide, and the other one of the first and second waveguides functions as an I/O waveguide.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
a dielectric layer comprising a first material;
a ring waveguide embedded in the dielectric layer, the ring waveguide comprising a second material different from the first material;
an input/output (I/O) waveguide embedded in the dielectric layer and optically coupled to the ring waveguide in a vertical manner, the I/O waveguide comprising a third material different from the first and second materials; and
a medium encircled by the dielectric layer and comprising a first side connected to the ring waveguide and a second side opposite to the first side and connected to the I/O waveguide, wherein the medium is different from the first, second and third materials.

2. The device of claim 1, wherein the second material has a semiconductor material, and the first and third materials have dielectric materials having different dielectric constants.

3. The device of claim 1, wherein the ring waveguide comprises arc segments and straight segments to form an oval shape in a top-view, and one of the straight segments overlaps the I/O waveguide.

4. The device of claim 1, wherein in a cross-sectional view, a width of the medium is less than a width of the ring waveguide and a width of the I/O waveguide.

5. The device of claim 1, further comprising:
a dielectric ring waveguide comprising the third material, wherein the dielectric ring waveguide alongside the I/O waveguide is embedded in the dielectric layer, and the dielectric ring waveguide is vertically spaced apart from the ring waveguide by the dielectric layer.

6. The device of claim 5, wherein in a top view, the ring waveguide comprises a first segment overlapping a first segment of the dielectric ring waveguide, a second segment overlapping the I/O waveguide, and a third segment connected to the first and second segments.

7. The device of claim 6, wherein the first and second segment of the ring waveguide are linear and the third segment of the ring waveguide is curved.

8. The device of claim 5, further comprising:
an additional I/O waveguide disposed at a same level of the dielectric layer as the I/O waveguide; and
an additional ring waveguide disposed at a same level of the dielectric layer as the ring waveguide, wherein:
the additional ring waveguide comprises a first segment overlapping a second segment of the dielectric ring waveguide, a second segment overlapping the additional I/O waveguide, and a third segment connected to the first and second segments.

9. The device of claim 8, wherein the dielectric ring waveguide comprises a third segment connected to the first and second segments of the dielectric ring waveguide, and the first, second, and third segments of the dielectric ring waveguide are curved.

10. The device of claim 1, wherein the medium is a cavity filled with air or gas.

11. A device, comprising:
an optical device disposed over a semiconductor substrate and embedded in a dielectric layer overlying the semiconductor substrate, the optical device comprising:
a first waveguide arranged in a loop; and
a second waveguide optically coupled to the first waveguide and comprising a material different from a material of the first waveguide, wherein a vertical distance between the first and second waveguides is a thickness of a portion of the dielectric layer interposed between the first and second waveguides;
an optical I/O portion laterally adjoining the optical device, the optical I/O portion comprising an optical coupler optically coupled to the second waveguide, wherein the second waveguide is an I/O waveguide providing an input and an output to the first waveguide; and
a medium encircled by the dielectric layer and comprising a first side connected to the first waveguide and a second side opposite to the first side and connected to the second waveguide, wherein the medium is different from the material of the first waveguide and the material of the second waveguide.

12. The device of claim 11, wherein the material of the first waveguide is of a semiconductor material, and a thermal conductivity of the material of the second waveguide is less than that of the material of the first waveguide.

13. The device of claim 12, wherein a top-view width of the second waveguide is greater than that of the first waveguide.

14. The device of claim 11, wherein the first waveguide comprises a first doped region and a second doped region having different conductivity types.

15. The device of claim 11, wherein the material of the second waveguide is of a semiconductor material, and a thermal conductivity of the material of the first waveguide is less than that of the material of the second waveguide.

16. The device of claim 15, wherein a top-view width of the first waveguide is greater than that of the second waveguide.

17. The device of claim 11, wherein the second waveguide comprises at least one doped region overlapping the first waveguide.

18. The device of claim 11, wherein in a cross-sectional view, a width of the medium is less than a width of the first waveguide.

19. The device of claim 11, wherein the medium is a cavity filled with air or gas.

20. A device, comprising:
a dielectric layer comprising a first material;
a ring waveguide structure embedded in the dielectric layer, the ring waveguide comprising a second material different from the first material;
a dielectric ring waveguide comprising the third material, wherein the dielectric ring waveguide is vertically spaced apart from the ring waveguide by the dielectric layer;
an input/output (I/O) waveguide embedded in the dielectric layer and optically coupled to the ring waveguide in a vertical manner, the I/O waveguide comprising a third material different from the first and second materials, wherein the dielectric ring waveguide alongside the I/O waveguide is embedded in the dielectric layer;
an additional I/O waveguide disposed at a same level of the dielectric layer as the I/O waveguide; and
an additional ring waveguide disposed at a same level of the dielectric layer as the ring waveguide, wherein the additional ring waveguide comprises a first segment overlapping a segment of the dielectric ring waveguide, a second segment overlapping the additional I/O waveguide, and a third segment connected to the first and second segments.

* * * * *